United States Patent
Yoshida

(10) Patent No.: US 9,641,006 B2
(45) Date of Patent: May 2, 2017

(54) BATTERY CONTROL SYSTEM, BATTERY PACK, ELECTRONIC DEVICE AND CHARGER

(71) Applicant: Tadahiro Yoshida, Kanagawa (JP)

(72) Inventor: Tadahiro Yoshida, Kanagawa (JP)

(73) Assignee: NEC ENERGY DEVICES, LTD., Kanagawa (JP)

(*) Notice: Subject to any disclaimer, the term of this patent is extended or adjusted under 35 U.S.C. 154(b) by 284 days.

(21) Appl. No.: 14/379,365

(22) PCT Filed: Feb. 8, 2013

(86) PCT No.: PCT/JP2013/000706
§ 371 (c)(1),
(2) Date: Aug. 18, 2014

(87) PCT Pub. No.: WO2013/128807
PCT Pub. Date: Sep. 6, 2013

(65) Prior Publication Data
US 2015/0008885 A1    Jan. 8, 2015

(30) Foreign Application Priority Data
Feb. 29, 2012    (JP) ................. 2012-044628

(51) Int. Cl.
*H02J 7/00*    (2006.01)
*H01M 10/42*    (2006.01)
(Continued)

(52) U.S. Cl.
CPC ......... *H02J 7/0026* (2013.01); *H01M 10/425* (2013.01); *H01M 10/441* (2013.01);
(Continued)

(58) Field of Classification Search
CPC ................................... H02J 7/0031
(Continued)

(56) References Cited

U.S. PATENT DOCUMENTS

| 5,493,197 A | 2/1996 | Eguchi et al. |
| 2004/0109274 A1* | 6/2004 | Sato ............... H02J 7/0031 361/90 |

(Continued)

FOREIGN PATENT DOCUMENTS

| CN | 101232193 A | 7/2008 |
| CN | 102315663 A | 1/2012 |

(Continued)

OTHER PUBLICATIONS

International Search Report of PCT/JP2013/000706 dated Mar. 12, 2013 [PCT/ISA/210].

(Continued)

*Primary Examiner* — Suresh Memula
(74) *Attorney, Agent, or Firm* — Sughrue Mion, PLLC

(57) ABSTRACT

A battery pack (10) includes a plurality of battery cells (100), a measurement unit (measurement unit (200)), and a battery control unit (battery control unit (400)). The plurality of battery cells 100 are connected in series to each other. The measurement unit (200) measures voltages of the battery cells (100). The battery control unit (400) controls discharge of the battery cells (100) on the basis of the voltages measured by the measurement unit (200). In addition, when the battery cells (100) perform the discharge, the battery control unit (400) specifies a minimum voltage cell in which the voltage is lowest on the basis of the voltages measured by the measurement unit (200). Further, before the minimum voltage cell is over-discharged, the battery control unit (400) outputs a first signal for reducing a discharge current in the discharge.

19 Claims, 14 Drawing Sheets

(51) Int. Cl.
   *H01M 10/44*   (2006.01)
   *H01M 10/48*   (2006.01)
(52) U.S. Cl.
   CPC ......... *H01M 10/482* (2013.01); *H02J 7/0021* (2013.01); *H01M 2010/4271* (2013.01); *Y02T 10/7055* (2013.01)
(58) Field of Classification Search
   USPC ........................................................ 320/134
   See application file for complete search history.

(56) References Cited

U.S. PATENT DOCUMENTS

| | | | | |
|---|---|---|---|---|
| 2004/0155629 A1* | 8/2004 | Kobayashi | ............ | H02J 7/0016 320/127 |
| 2007/0145949 A1* | 6/2007 | Matsushima | ............. | H02J 7/00 320/132 |
| 2009/0091295 A1* | 4/2009 | Wan | ..................... | H02J 7/0026 320/134 |
| 2011/0228436 A1* | 9/2011 | Lee | .............................. | 361/93.7 |
| 2012/0313574 A1* | 12/2012 | Maetani | ................. | H02J 7/008 320/107 |
| 2013/0103333 A1* | 4/2013 | Nishida | ............... | H01M 10/482 702/63 |

FOREIGN PATENT DOCUMENTS

| | | |
|---|---|---|
| EP | 0588613 A2 | 3/1994 |
| JP | 06-104015 A | 4/1994 |
| JP | 09-215111 A | 8/1997 |
| JP | 2003-217679 A | 7/2003 |
| JP | 2012-023919 A | 2/2012 |

OTHER PUBLICATIONS

Communication dated Dec. 31, 2015 from the State Intellectual Property Office of the P.R. C. issued in corresponding Application No. 201380011531.4.

Communication dated Feb. 14, 2017 issued by the Japanese Patent Office in corresponding Japanese Application No. 2014-501991 English Translation.

* cited by examiner

FIG. 3
(a)
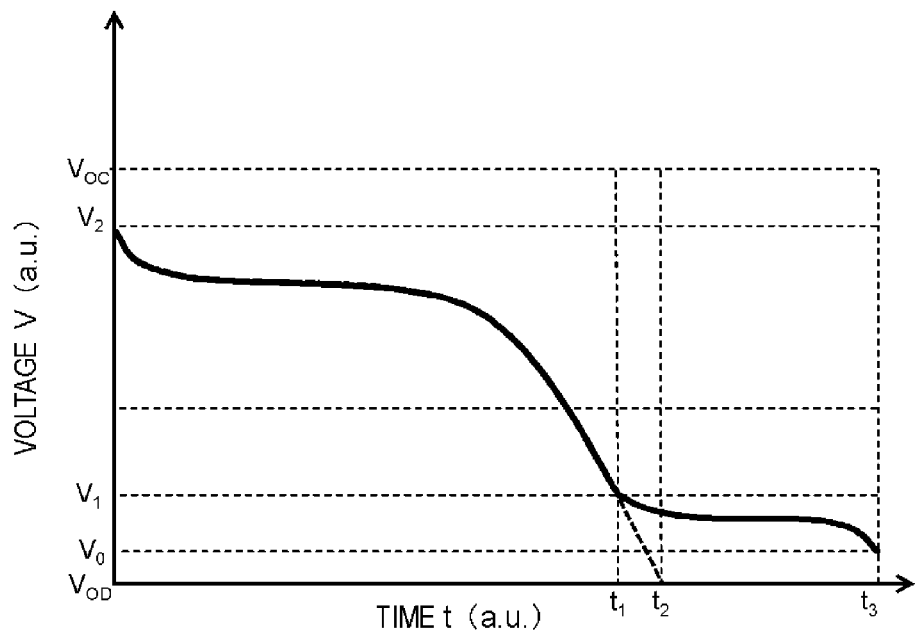
(b)
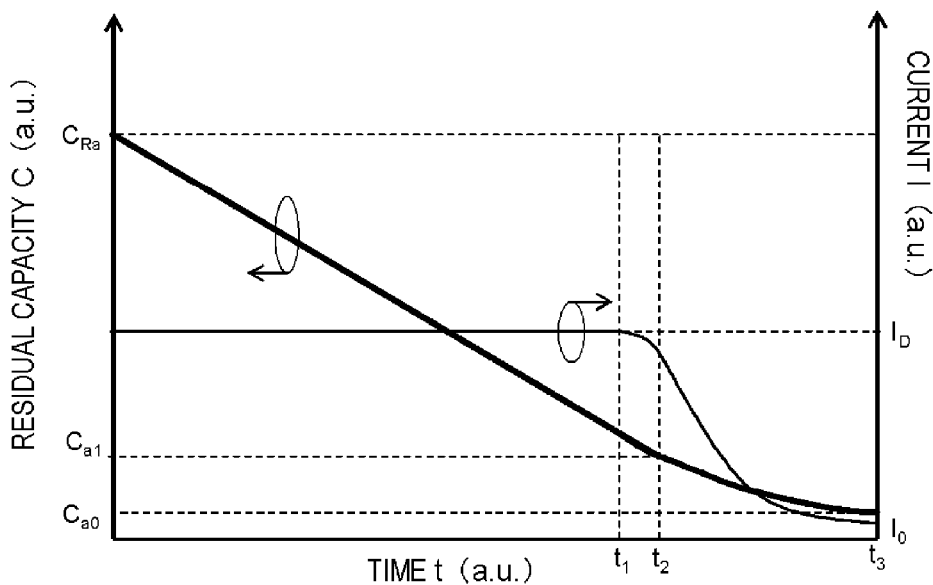

FIG. 4
(a)
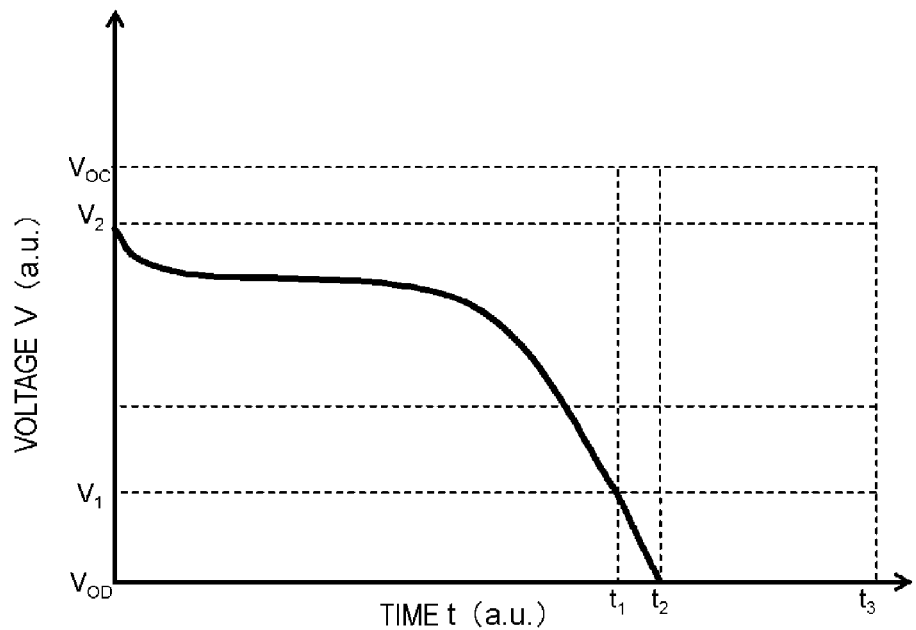
(b)
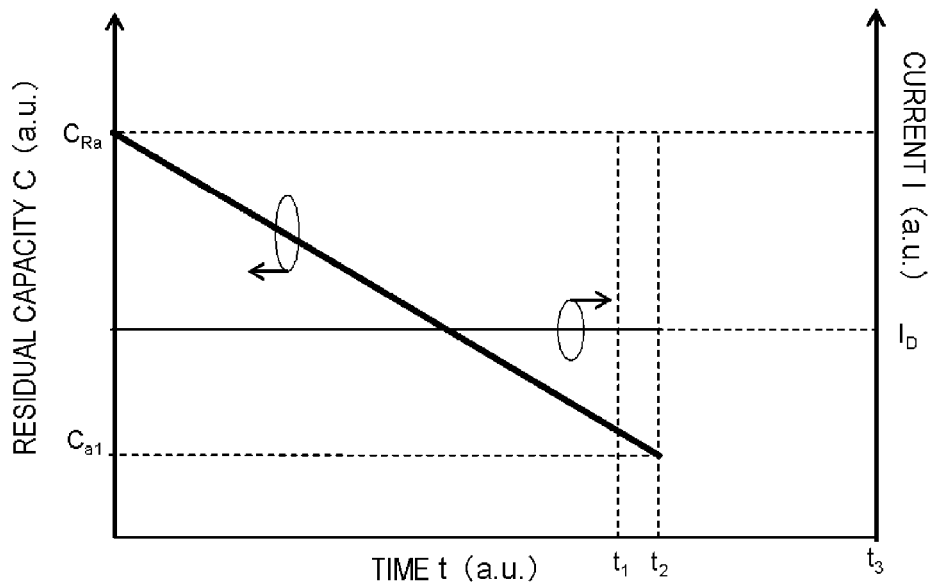

FIG. 5
(a)
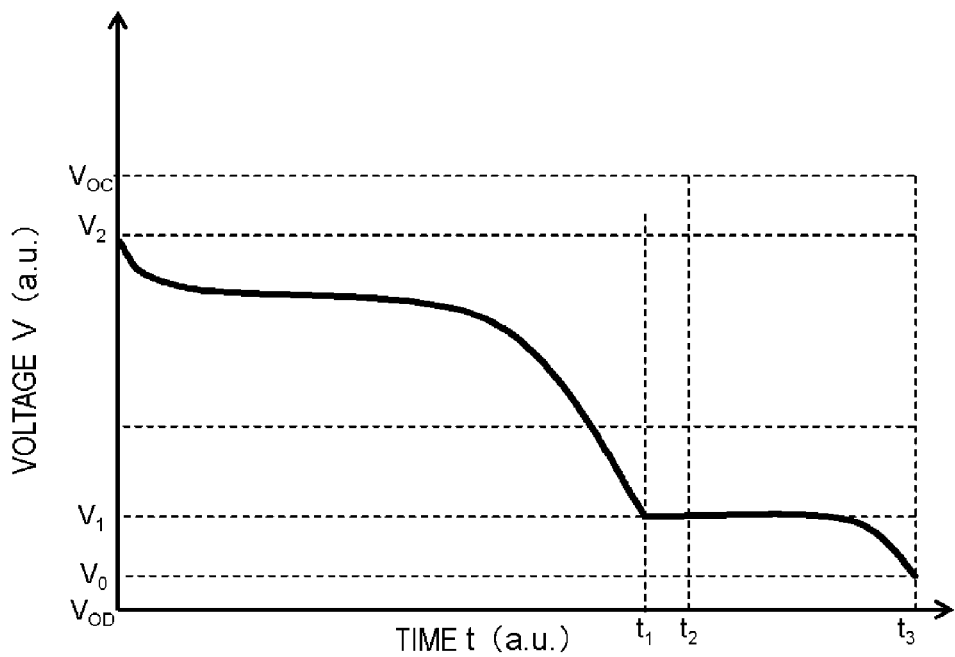
(b)
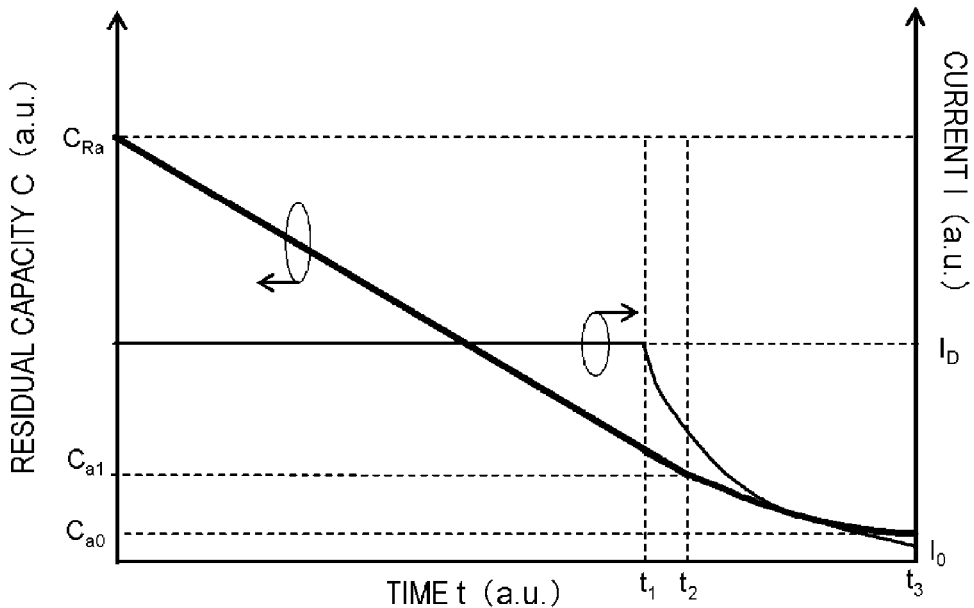

FIG. 12
(a)
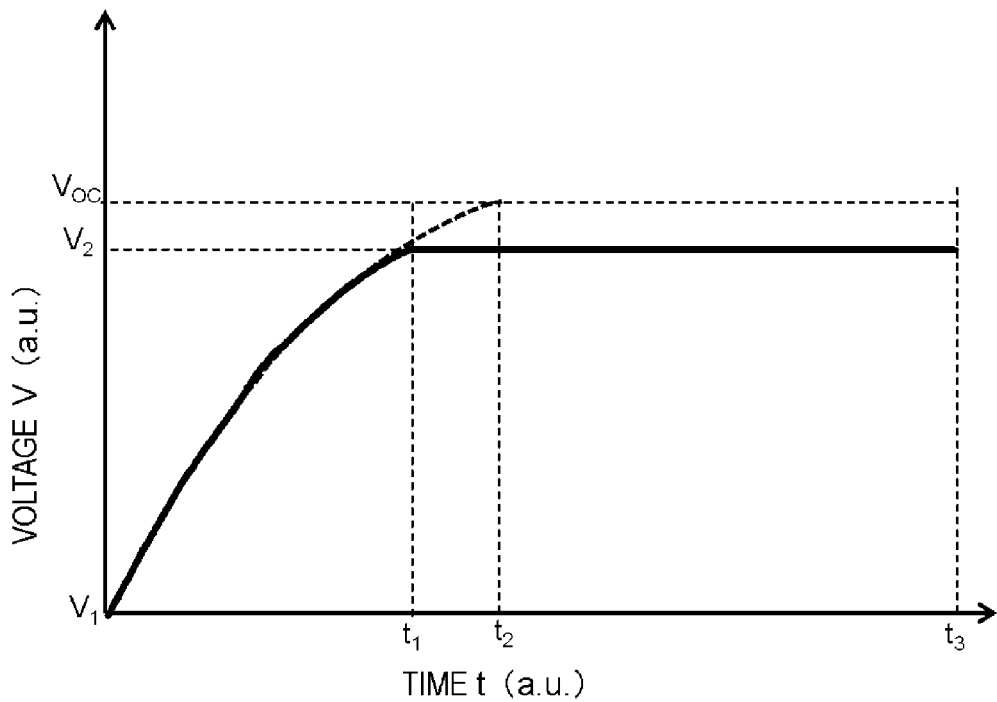
(b)
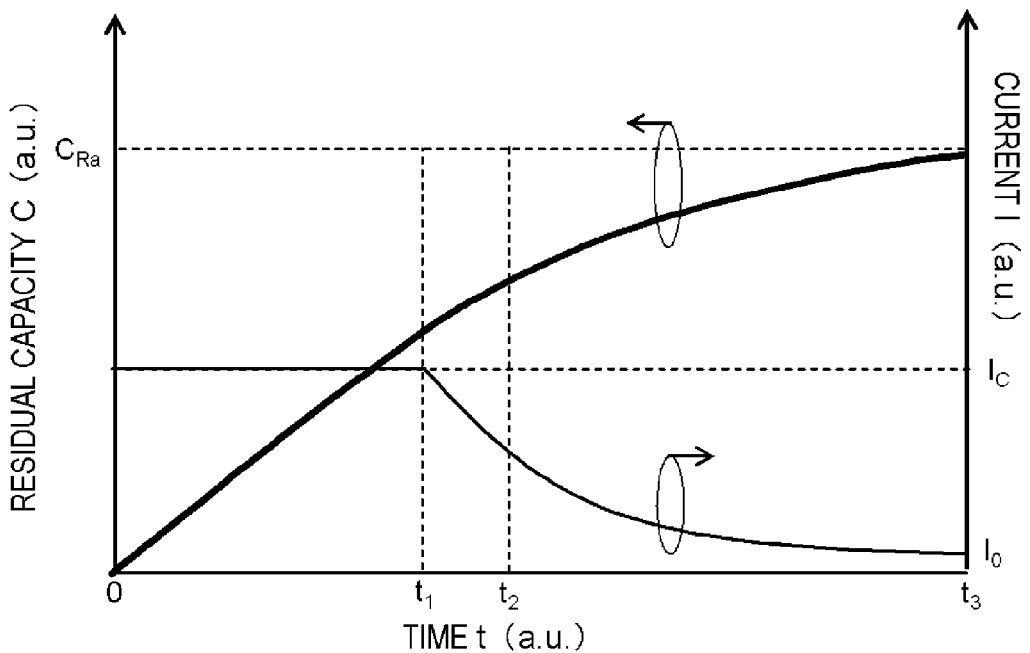

FIG. 13
(a)
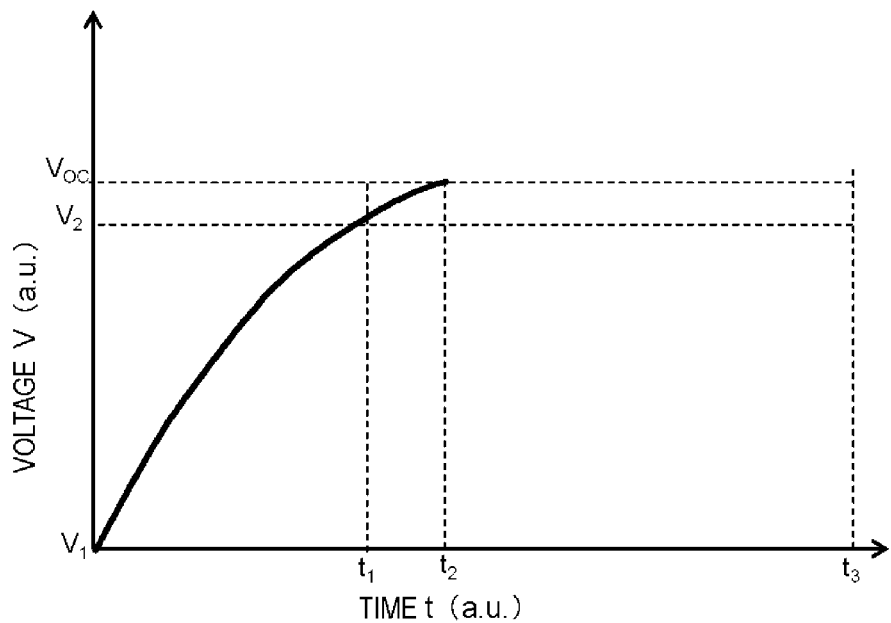
(b)
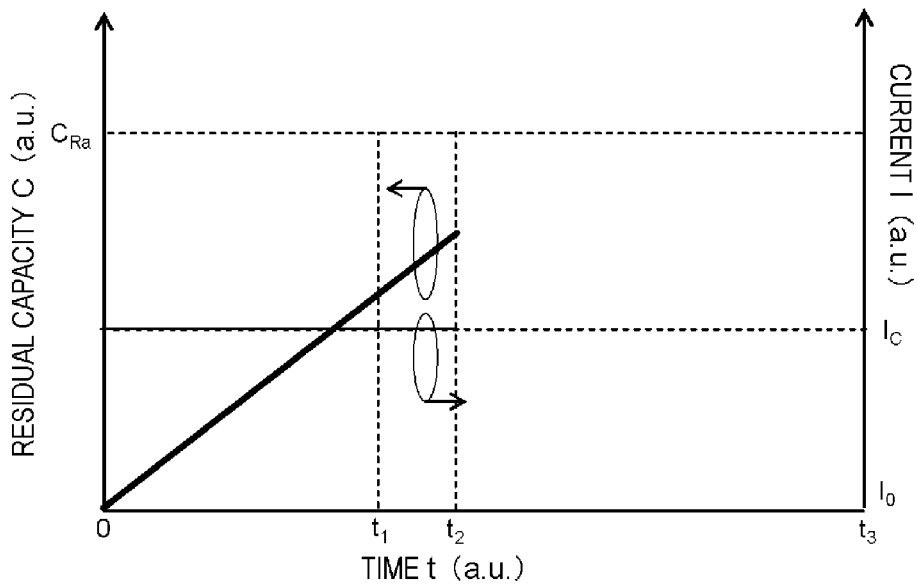

BATTERY CONTROL SYSTEM, BATTERY PACK, ELECTRONIC DEVICE AND CHARGER

CROSS REFERENCE TO RELATED APPLICATIONS

This is a National Stage of International Application No. PCT/JP2013/000706 filed Feb. 8, 2013, claiming priority based on Japanese Patent Application No. 2012-044628 filed Feb. 29, 2012, the contents of all of which are incorporated herein by reference in their entirety.

TECHNICAL FIELD

The present invention relates to a battery control system, a battery pack, an electronic device and a charger.

BACKGROUND ART

Various methods for stably performing discharge or charge of a battery pack are proposed.

Patent Document 1 (Japanese Unexamined Patent Publication No. 2003-217679) discloses the following discharge method. Whenever a battery voltage drops to a discharge termination voltage during discharge of a secondary battery, the secondary battery is intermittently discharged while repeating a temporary stop. At this time, each time discharge is restarted after a temporary stop, the discharge is performed while a discharge current is reduced in a stepwise manner. Thereby, compared to a case where high-rate discharge is performed continuously, it is considered possible to extract a large discharge amount from a secondary battery, and to stably increase the discharge amount.

RELATED DOCUMENT

Patent Document

[Patent Document 1] Japanese Unexamined Patent Publication No. 2003-217679

DISCLOSURE OF THE INVENTION

The inventor has found that the following problem occurs in a battery pack having a plurality of battery units which are connected in series to each other. The voltages of the respective battery units are not necessarily equal to each other. For this reason, when the battery unit having the lowest voltage reaches an over-discharge detection voltage during discharge of the battery pack, the discharge is terminated at this timing. In this case, there has been the possibility of the discharge being terminated in a state where a residual capacity of all the battery units remains.

According to the present invention, there is provided a battery control system including: a measurement unit that measures voltages of a plurality of battery units which are connected in series to each other; and a battery control unit that controls discharge of the battery units on the basis of the voltages measured by the measurement unit, wherein the battery control unit specifies a minimum voltage unit in which the voltage is lowest, on the basis of the voltages measured by the measurement unit, when the discharge of the battery unit is performed, and outputs a first signal for reducing a discharge current in the discharge before the minimum voltage unit is over-discharged.

According to the present invention, there is provided a battery control system including: a measurement unit that measures voltages of a plurality of battery units which are connected in series to each other; and a battery control unit that controls charge of the battery units on the basis of the voltages measured by of the measurement unit, wherein the battery control unit specifies a maximum voltage unit in which the voltage is highest, on the basis of the voltages measured by the measurement unit, when the charge is performed on the battery units, and outputs a first signal for reducing a charge current in the charge before the maximum voltage unit is over-charged.

According to the present invention, there is provided a battery pack including: a plurality of battery units which are connected in series to each other; a measurement unit that measures voltages of the battery units; and a battery control unit that controls discharge of the battery units on the basis of the voltages measured by the measurement unit, wherein the battery control unit specifies a minimum voltage unit in which the voltage is lowest, on the basis of the voltages measured by the measurement unit, when the discharge of the battery unit is performed, and outputs a first signal for reducing a discharge current in the discharge before the minimum voltage unit is over-discharged.

According to the present invention, there is provided a battery pack including: a plurality of battery units which are connected in series to each other; a measurement unit that measures voltages of the battery units; and a battery control unit that controls charge of the battery units on the basis of the voltages measured by of the measurement unit, wherein the battery control unit specifies a maximum voltage unit in which the voltage is highest, on the basis of the voltages measured by the measurement unit, when the charge is performed on the battery units, and outputs a first signal for reducing a charge current in the charge before the maximum voltage unit is over-charged.

According to the present invention, there is provided an electronic device including: a battery pack including a plurality of battery units which are connected in series to each other; a measurement unit that measures voltages of the battery units; a battery control unit that controls discharge of the battery units on the basis of the voltages measured by the measurement unit; a load that consumes power of the discharge from the battery pack; and a load control unit, connected to the battery control unit which controls the load, wherein the battery control unit specifies a minimum voltage unit in which the voltage is lowest, on the basis of the voltages measured by the measurement unit, when the discharge of the battery unit is performed, and outputs a first signal for reducing a discharge current in the discharge before the minimum voltage unit is over-discharged, and the load control unit reduces the discharge current when the first signal is received from the battery control unit.

According to the present invention, there is provided a charger including: a measurement unit that measures voltages of a plurality of battery units which are connected in series to each other; a battery control unit that controls charge of the battery units on the basis of the voltages measured by of the measurement unit; and a charge control unit, connected to the battery control unit, which controls a charge voltage and a charge current in the charge, wherein the battery control unit specifies a maximum voltage unit in which the voltage is highest, on the basis of the voltages measured by the measurement unit, when the charge is performed on the battery units, and outputs a first signal for reducing the charge current in the charge before the maximum voltage unit is over-charged, and the charge control unit reduces the charge current when the first signal is received from the battery control unit.

According to the present invention, when the discharge of the battery unit is performed, the battery control unit outputs the first signal for reducing the discharge current in the discharge before the minimum voltage unit is over-discharged. Thereby, a case where the minimum voltage unit is over-discharged does not occur. In addition, when the charge of the battery unit is performed, the battery control unit outputs the first signal for reducing the charge current in the charge before the maximum voltage unit is over-charged. Thereby, a case where the maximum voltage unit is over-charged does not occur. In this manner, it is possible to prevent the termination of the charge and discharge due to the voltage of a specific battery cell. Therefore, a plurality of battery units which are connected in series to each other can be prevented from being over-discharged or over-charged, and be stably discharged or charged.

BRIEF DESCRIPTION OF THE DRAWINGS

The above-mentioned objects, other objects, features and advantages will be made clearer from the preferred exemplary embodiments described below, and the following accompanying drawings.

FIG. 3(a) shows a relationship between the time from a discharge start time and the voltage of the minimum voltage cell in first exemplary embodiment. FIG. 3(b) shows a relationship between the time from a discharge start time and the residual capacity of the minimum voltage cell in the first exemplary embodiment, and a relationship between the time from the discharge start time and the current of the minimum voltage cell.

FIG. 4(a) shows a relationship between the time from the discharge start time and the voltage of the minimum voltage cell in the comparative example. FIG. 4(b) shows a relationship between the time from the discharge start time and the residual capacity of the minimum voltage cell in the comparative example, and a relationship between the time from the discharge start time and the current of the minimum voltage cell.

FIG. 5(a) shows a relationship between the time from the discharge start time and the voltage of the minimum voltage cell in the second exemplary embodiment. In addition, FIG. 5(b) shows a relationship between the time from the discharge start time and the residual capacity of the minimum voltage cell in the second exemplary embodiment, and a relationship between the time from the discharge start time and the current of the minimum voltage cell.

FIG. 12(a) shows a relationship between the time from the charge start time and the voltage of the maximum voltage cell in the seventh exemplary embodiment. FIG. 12(b) shows a relationship between the time from the charge start time and the residual capacity of the maximum voltage cell in the seventh exemplary embodiment, and a relationship between the time from the discharge start time and the current of the maximum voltage cell.

FIG. 13(a) shows a relationship between the time from the charge start time and the voltage of a battery cell in a comparative example. FIG. 13(b) shows a relationship between the time from the charge start time and the residual capacity of the battery cell in the comparative example, and a relationship between the time from the charge start time and the current of the comparative battery cell.

DESCRIPTION OF EXEMPLARY EMBODIMENTS

Figure 1:
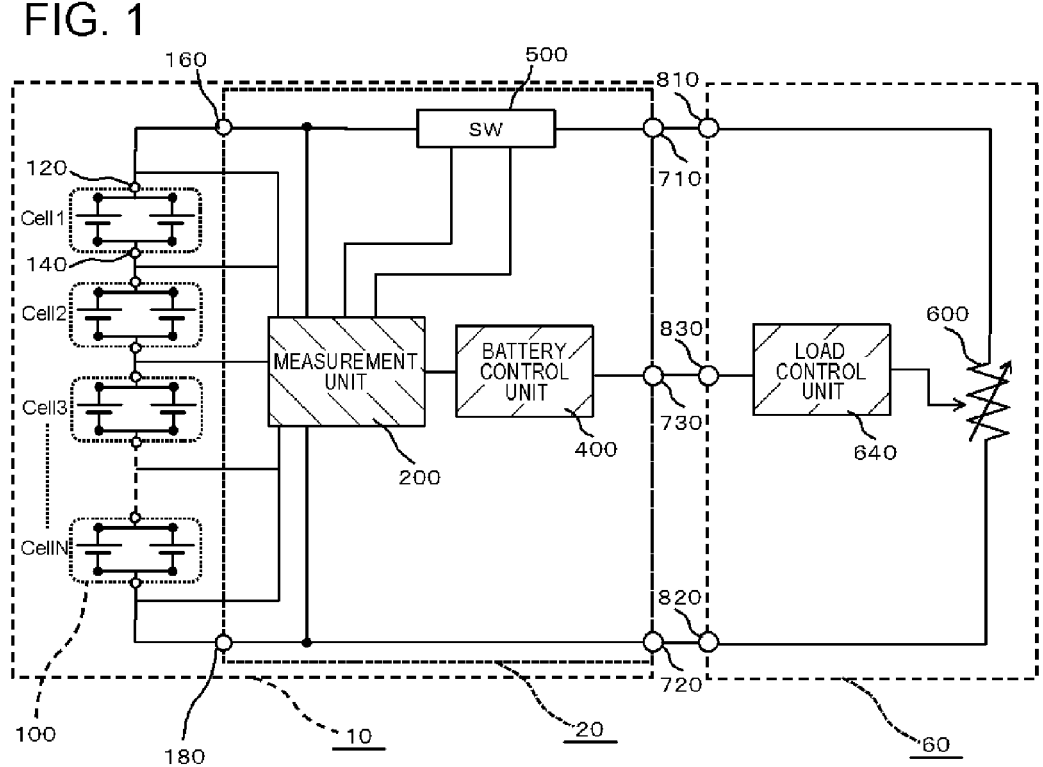
FIG. 1 is a circuit diagram illustrating a configuration of a battery pack and an electronic device according to a first exemplary embodiment.

Hereinafter, exemplary embodiments of the present invention will be described with reference to the accompanying drawings. In all the drawings, like elements are referenced by like reference numerals and descriptions thereof will not be repeated.

The term "battery pack 10" as used herein refers to an assembled battery having a plurality of battery units. In addition, the term "battery unit" refers to a unit having at least one or more battery cells 100. Further, the battery cell 100 included in the "battery unit" may include a plurality of single batteries having a positive electrode, a negative electrode and the like. In addition, a plurality of "battery units" may include a different quantity of the battery cells 100, respectively. In the following, a description will be given of a case where the "battery unit" included in the "battery pack 10" is the battery cell 100 having two single batteries which are connected in parallel to each other.

First Exemplary Embodiment

The battery pack 10 according to a first exemplary embodiment will be described with reference to FIGS. 1 and 2. FIG. 1 is a circuit diagram illustrating a configuration of the battery pack 10 and an electronic device 60 according to the first exemplary embodiment. The battery pack 10 includes a plurality of battery cells 100, a measurement unit (measurement unit 200), and a battery control unit (battery control unit 400). The plurality of battery cells 100 are connected in series to each other. The measurement unit 200 measures the voltages of the battery cells 100. The battery control unit 400 controls discharge of the battery cells 100 on the basis of the voltages measured by the measurement unit 200. In addition, when the discharge of the battery cells 100 is performed, the battery control unit 400 specifies a minimum voltage cell in which the voltage is lowest, on the basis of the voltages measured by the measurement unit 200. Further, the battery control unit 400 outputs a first signal for reducing a discharge current in the discharge before the minimum voltage cell is over-discharged. Hereinafter, a detailed description will be given.

As shown in FIG. 1, the battery pack 10 includes a plurality of battery cells 100. Here, the battery pack 10 includes, for example, N battery cells 100. In addition, as described above, the battery cell 100 has two single batteries. Specifically, the battery cell 100 is a Li-ion secondary battery. In addition, the battery cell 100 is, for example, a laminate-type battery in which a laminate film is used in an exterior material. In the battery pack 10 according to the first exemplary embodiment, the plurality of battery cells 100 are received in exterior bodies (not shown), respectively, and are packaged in the battery pack 10 in a state where the battery cells are placed in a row. Meanwhile, the package aspect of the battery cell 100 may be formed in an arbitrary manner, and may be formed, for example, in a state where the plurality of battery cells 100 are laminated in a row in the thickness direction thereof, or in a state where the laminated battery cells 100 are disposed adjacent to each other in a plurality of rows. In such a package or the like, it is also possible to obtain the same effect as that in the first exemplary embodiment.

Here, when the battery pack 10 is charged and discharged, all the battery cells 100 are not limited to having the same voltage. As a first reason, it is considered that a difference in internal resistance occurs in each of the battery cells 100. Each of the battery cells 100 has an internal resistance. This internal resistance has a tendency to increase as the temperature becomes lower. For this reason, a difference in internal resistance occurs in each of the battery cells 100 due to a temperature difference within the battery pack 10. A voltage drops due to each internal resistance in proportion to a current value of charge and discharge. Therefore, there is the possibility of the voltage of each of the battery cells 100 varying. Particularly, when a current during discharge becomes larger, a voltage drop component due to the internal resistance increases. For this reason, there is the possibility of a significant variation in voltage occurring due to a difference in internal resistance.

In addition, as a second reason, it is considered that full charge capacities of the respective battery cells 100 are different from each other. The full charge capacity of the battery pack 10 is reduced by repeating charge and discharge. In this process, it is not always true that the full charge capacities of the respective battery cells 100 are reduced equally. When the battery pack 10 is discharged, the battery cell 100 of which the full charge capacity is most reduced has a drop in voltage during discharge faster than other battery cells 100. In addition, the battery cell 100 of which the full charge capacity is most reduced has a rise in voltage during charge faster than other battery cells 100. Meanwhile, the "full charge capacity" as used herein refers to a capacity (in Ah) when the battery cell 100 is fully charged. Therefore, in this case, there is also the possibility of the voltage of each of the battery cells 100 varying.

In this manner, there is the possibility of the voltage of each of the battery cells 100 varying due to various reasons. Here, as described as the first reason, it is assumed that a difference in internal resistance occurs due to, for example, the occurrence of a temperature difference in each of the battery cells 100. In this case, the battery cell 100 having the highest voltage is called a "maximum voltage cell", and the battery cell 100 having the lowest voltage is called a "minimum voltage cell".

The battery pack 10 according to the first exemplary embodiment includes a control circuit 20 in addition to the battery cells 100. The control circuit 20 includes a measurement unit 200, a battery control unit 400 and a switch 500.

In addition, the control circuit 20 is connected to the battery cells 100 which are connected in series to each other. The control circuit 20 includes an internal positive electrode terminal 160, an internal negative electrode terminal 180, an external positive electrode terminal 710 and an external negative electrode terminal 720. The internal positive electrode terminal 160 is connected to a positive electrode terminal 120 of one battery cell 100 connected in series. In addition, the internal negative electrode terminal 180 is connected to a negative electrode terminal 140 of another battery cell 100 connected in series.

The internal positive electrode terminal 160 is connected to the external positive electrode terminal 710 for connection to an external device using the battery pack 10 through an interconnect (no sign shown) within the control circuit 20. In addition, the internal negative electrode terminal 180 is also connected to the external negative electrode terminal 720 similarly. Meanwhile, the internal negative electrode terminal 180 and the external negative electrode terminal 720 are grounded to a ground (GND).

The switch 500 for stopping charge or discharge is provided between the internal positive electrode terminal 160 and the external positive electrode terminal 710. The switch 500 is provided between, for example, the internal positive electrode terminal 160 on the battery cell 100 side and the external positive electrode terminal 710. In this case, the switch 500 is, for example, a P-channel metal oxide semiconductor field effect transistor (MOSFET). Two P-channel MOSFETs are provided within the switch 500. Thereby, one MOSFET is used for controlling charge. On the other hand, the other MOSFET is used for controlling discharge. In addition, each MOSFET in the switch 500 is connected to the measurement unit 200.

Meanwhile, when the switch 500 is an N-channel MOSFET, the switch 500 is disposed between the internal negative electrode terminal 180 and the external negative electrode terminal 720. Besides, the switch 500 may be, for example, an insulated gate bipolar transistor (IGBT), a relay or a breaker.

The measurement unit 200 measures the voltage of each of the plurality of battery cells 100. The measurement unit 200 is connected between the battery cells 100 through an interconnect (no sign shown). In addition, the measurement unit 200 may measure a voltage between both ends of the internal positive electrode terminal 160 and the internal negative electrode terminal 180 in order to measure the sum of the voltages of the plurality of battery cells 100 which are connected in series to each other. Further, the measurement unit 200 may measure a current flowing through the battery cells 100.

The battery control unit 400 is connected to the measurement unit 200. The battery control unit 400 controls the discharge of each of the battery cells 100 on the basis of the voltages measured by the measurement unit 200. The battery control unit 400 includes an arithmetic operation unit (not shown) that performs an arithmetic operation process on the basis of the voltages measured by the measurement unit 200. In addition, the battery control unit 400 includes a communication unit (not shown) for transmitting a signal from the battery control unit 400 to the electronic device 60 or receiving a signal from the electronic device 60. The battery control unit 400 is connected to a communication terminal 730 for transmitting and receiving a signal to and from the electronic device 60.

In addition, the measurement unit 200, the battery control unit 400 and the switch 500 improve safety and the cycle life of charge and discharge, and thus function as protection circuits. When the battery cell 100 is discharged down to an over-discharge detection voltage value $V_{OD}$ or lower described later, the measurement unit 200, the battery control unit 400 and the switch 500 terminate the discharge forcibly with respect to the battery cell. Besides, the battery control unit 400 includes a storage unit (not shown) that stores a discharge reference voltage value $V_1$ or the like described later.

In this manner, in the first exemplary embodiment, the battery pack 10 including the plurality of battery cells 100 and control circuit 20 is packaged.

Next, the electronic device 60 connected to the battery pack 10 according to the first exemplary embodiment will be described. The electronic device 60 includes a load 600 and a load control unit (load control unit 640). The load 600 of the electronic device 60 consumes power due to discharge from the battery pack 10. The load control unit 640 is connected to the battery control unit 400, and receives a first signal and controls the load 600. In addition, when the first signal is received from the battery control unit 400, the load control unit 640 reduces a discharge current. Hereinafter, a detailed description will be given.

FIG. 1 schematically shows the electronic device 60. The load 600, provided therein, consumes power due to the discharge from the battery pack 10. In FIG. 1, the load 600 is shown collectively as a variable resistor that consumes power.

Here, the electronic device 60 is, for example, a display device. Specifically, the electronic device 60 is a liquid crystal display device. Therefore, the electronic device 60 includes a display unit, a light-emitting unit, a tuner unit, an operating unit and the like (all not shown) as the load 600. The load 600 includes at least one or more light-emitting units (not shown). The light-emitting unit is, for example, a backlight of a liquid crystal display device.

The load 600 is connected to a positive electrode terminal 810 and a negative electrode terminal 820 through an interconnect (not shown). The positive electrode terminal 810 and the negative electrode terminal 820 of the electronic device 60 are connected to the external positive electrode terminal 710 and the external negative electrode terminal 720 of the battery pack 10 through, for example, an interconnect (no sign shown). Thereby, the electronic device 60 can receive power due to the discharge of the battery pack 10.

The load control unit 640 is connected to the load 600. The load control unit 640 controls the load 600. Thereby, the load control unit 640 controls the amount of power consumption due to the load 600. Specifically, for example, when the load 600 includes a backlight, the load control unit 640 controls the luminance of the backlight.

In addition, the load control unit 640 is connected to a communication terminal 830. The communication terminal 830 on the electronic device 60 side is connected to the communication terminal 730 on the battery pack 10 side through, for example, an interconnect (not shown). Thereby, the load control unit 640 is connected to the battery control unit 400, and can receive the first signal.

Besides, the load control unit 640 may include an arithmetic operation unit (not shown). The arithmetic operation unit performs an arithmetic operation process in accordance with the first signal described later, and can perform the most appropriate control on the load 600 at that point in time.

When the first signal is received from the battery control unit 400, the load control unit 640 reduces a discharge current. In this case, for example, when the load 600 includes a backlight, the load control unit 640 reduces the discharge current by lowering the luminance of the light-emitting unit. Thereby, it is possible to prevent the minimum voltage cell from being over-discharged. In addition, it is possible to prevent a user from not being able to use the electronic device 60 suddenly. The details of this discharge control method will be described later.

In addition, the load control unit 640 may cause a display unit (not shown) of the electronic device 60 to perform a display for making known that the residual capacity of the battery pack 10 is low. Thereby, it is possible to prepare a user for the electronic device 60 not being able to be used.

Next, the discharge control method of the battery pack 10 stated above will be described with reference to FIGS. 2 and 3. FIG. 2 is a flow diagram illustrating a discharge control method according to the first exemplary embodiment. FIG. 3 is a diagram illustrating a discharge control method according to the first exemplary embodiment. The discharge control method according to the first exemplary embodiment includes the following steps. First, when the discharge of the battery cells 100 is performed, a minimum voltage cell in which the voltage is lowest is specified on the basis of the voltages measured by the measurement unit 200 (S120). Next, before the minimum voltage cell is over-discharged, a first signal for reducing a discharge current in the discharge is output (S140). Hereinafter, a detailed description will be given.

Here, each of the battery cells 100 is set to be in a state of being charged up to full charge. The discharge voltage of each of the battery cells 100 in an initial step is a charge reference voltage value $V_2$. In addition, the residual capacity of each of the battery cells 100 is a full charge capacity.

Figure 2:
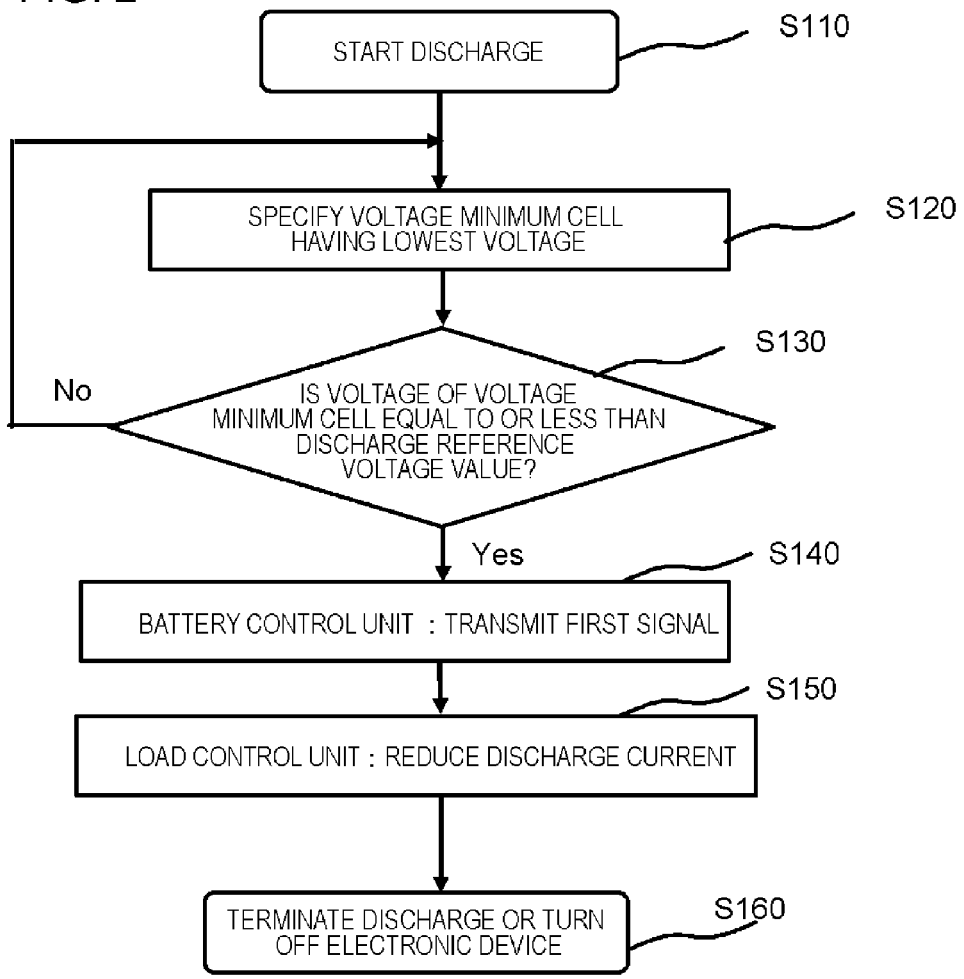
FIG. 2 is a flow diagram illustrating a discharge control method according to the first exemplary embodiment.

First, in FIG. 2, the positive electrode terminal 810 and the negative electrode terminal 820 of the electronic device 60 are connected to the external positive electrode terminal 710 and external negative electrode terminal 720 of the battery pack 10, respectively. Thereby, discharge from the plurality of battery cells 100 is started. At the same time, the measurement unit 200 measures the voltages of the plurality of battery cells 100 which are connected in series to each other (S110). In addition, the current of the battery cells 100 may be measured.

Here, power due to the discharge of the battery pack 10 is consumed by the load 600 of the electronic device 60. In addition, the load 600 is controlled by the load control unit 640, and thus operates at a constant current. Meanwhile, here, the switch 500 is considered to have no internal resistance.

Next, the battery control unit 400 specifies the minimum voltage cell in which the voltage is lowest on the basis of the voltages measured by the measurement unit 200 (S120).

Here, FIG. 3(a) shows a relationship between the time from a discharge start time and the voltage of the minimum voltage cell in the first exemplary embodiment. The voltage of the battery cell 100 drops monotonically due to a voltage drop caused by the discharge of the battery cell 100 and a voltage drop caused by the internal resistance. In addition, all the battery cells 100 including the minimum voltage cell are connected in series to each other. For this reason, currents flowing through the respective battery cells 100 are all equal to each other. On the other hand, the internal resistances of the respective battery cells 100 are different from each other. For example, the internal resistance of the battery cell 100 having the lowest temperature is largest. Since the voltage drop caused by the internal resistance is proportional to a current, the voltage drop component of the battery cell 100 having the largest internal resistance is larger than those of other battery cells 100. That is, the voltage drop of the minimum voltage cell is faster than those of other battery cells 100. Therefore, the battery cell 100 having the largest internal resistance is specified as a "minimum voltage cell".

In addition, FIG. 3 (b) shows a relationship between the time from a discharge start time and the residual capacity of the minimum voltage cell in the first exemplary embodiment, and a relationship between the time from the discharge start time and the current of the minimum voltage cell.

In FIG. 3 (b), the load 600 operates at a constant current by the load control unit 640. For this reason, discharge to time $t_1$ is constant current discharge. Therefore, the discharge currents of all the battery cells 100 are a constant current value $I_D$ and are constant. In addition, the residual capacity of each of the battery cells 100 drops linearly.

Meanwhile, in the initial step of discharge, the battery cell 100 corresponding to the minimum voltage cell may change. In that case, the battery cell 100 having the lowest voltage at the present time is specified as a "minimum voltage cell", and the specified "minimum voltage cell" may be changed on the basis of the voltages measured at any time.

Next, after the minimum voltage cell is specified, the battery control unit 400 determines an alarm condition that the voltage of the minimum voltage cell is equal to or less than the discharge reference voltage value $V_1$ (S130). As described later, this "discharge reference voltage value $V_1$" is a reference voltage for determining that the minimum voltage cell is close to over-discharge. Meanwhile, the "discharge reference voltage value $V_1$" is stored in the storage unit of the battery control unit 400.

Here, the "discharge reference voltage value $V_1$" is set to be higher than the over-discharge detection voltage value $V_{OD}$. The "discharge reference voltage value $V_1$" is set on the basis of a characteristic on the electronic device 60 side such as how long the electronic device 60 to which the battery pack 10 is connected is sustained. For example, when the electronic device 60 has a characteristic of being shut down in a case where the discharge voltage of the battery pack 10 becomes equal to or less than a predetermined voltage, the predetermined voltage can be set to the "discharge reference voltage value $V_1$".

On the other hand, the "discharge reference voltage value $V_1$" may be set on the basis of a characteristic on the battery pack 10 side. The "discharge reference voltage value $V_1$" can be set to, for example, a value obtained by adding the measurement accuracy of the measurement unit 200 to the over-discharge detection voltage value $V_{OD}$. The "measurement accuracy of the measurement unit 200" as used herein refers to, for example, the voltage detection accuracy of an IC of the measurement unit 200. Specifically, the "discharge reference voltage value $V_1$" is, for example, $V_{OD}$+100 mV.

In addition, the "discharge reference voltage value $V_1$" may be set to be equal to or greater than a discharge termination voltage value $V_0$. The "discharge termination voltage value $V_0$" as used herein refers to a voltage value for the electronic device 60 side to determine that the battery pack 10 has no residual capacity.

As described above, the minimum voltage cell is not over-discharged by setting the "discharge reference voltage value $V_1$", and thus it is possible to suppress the deterioration of the minimum voltage cell.

The "over-discharge detection voltage value $V_{OD}$" as used herein refers to, for example, a lower limit of a voltage for suppressing deterioration in a lithium-ion secondary battery or the like. When the minimum voltage cell reaches the "over-discharge detection voltage value $V_{OD}$", the discharge of the battery pack 10 is terminated forcibly. Specifically, the battery control unit 400 transmits a signal for stopping discharge to the switch 500 through the measurement unit 200. Thereby, control is performed so that the minimum voltage cell is not over-charged. In the present exemplary embodiment, the "over-discharge detection voltage value $V_{OD}$" is stored in the storage unit of the battery control unit 400.

As in a case before time $t_1$, when the voltage of the minimum voltage cell is higher than the discharge reference voltage value $V_1$, and the alarm condition is not satisfied (S130; No), the battery control unit 400 continues the discharge of all the battery cells 100 as it is.

On the other hand, when the voltage of the minimum voltage cell is set to be equal to or less than the discharge reference voltage value $V_1$, and the alarm condition is satisfied (S130; Yes), the battery control unit 400 outputs the first signal for reducing a discharge current in the discharge (S140). The first signal is transmitted to the load control unit 640 of the electronic device 60 through the communication terminal 730 of the battery pack 10 and the communication terminal 830 of the electronic device 60.

The "first signal" as used herein refers to a signal which is output in order for the battery control unit 400 to reduce a discharge current on the load 600 side. The "first signal" can be changed depending on the connected electronic device 60. Specifically, the "first signal" may be, for example, a 1-bit signal for switching between the turn-on or turn-off of the load 600. In addition, the "first signal" may be, for example, a signal corresponding to the present voltage value of the minimum voltage cell. In addition, the "first signal" may include a signal corresponding to the present current value of the battery pack 10.

In addition, a period in which the "first signal" is output can be set to only a moment when the above alarm condition is established. In this case, after the load control unit 640 receives the first signal, the load control unit 640 performs all the controls for reducing a discharge current. On the other hand, the period in which the "first signal" is output may be set to a period continuing while the above alarm condition is satisfied. In this case, the "first signal" can be changed depending on the situation at any time. For example, the battery control unit 400 can continue to transmit a signal corresponding to the present voltage value of the minimum voltage cell stated above.

Here, in FIGS. 3(a) and 3(b), the time when the alarm condition is satisfied (S130; Yes) is time $t_1$. As shown in FIG. 3(a), the voltage of the minimum voltage cell is set to the discharge reference voltage value $V_1$. Therefore, the voltage of the minimum voltage cell is in a state where the alarm condition is satisfied. Meanwhile, although not shown in the drawing, at time $t_1$, the voltages of other battery cells 100 are equal to or greater than the discharge reference voltage value $V_1$.

In addition, as shown in FIG. 3(b), at time $t_1$, the residual capacity of the minimum voltage cell is $C_{a1}$, and the residual capacity remains yet. Meanwhile, the residual capacities of all the battery cells 100 also remain yet.

Next, when the first signal is received from the battery control unit 400 at time $t_1$, the load control unit 640 reduces a discharge current (S150).

In the first exemplary embodiment, the load 600 includes a light-emitting unit such as a backlight. In this case, the load control unit 640 reduces the discharge current by lowering the luminance of the light-emitting unit.

As shown in FIG. 3(b), after time $t_1$, the load control unit 640 reduces the discharge current gradually from the constant current value $I_D$. Specifically, when a current flowing through the light-emitting unit is reduced, the load control unit 640 lowers the luminance. In this case, the residual capacity of the minimum voltage cell drops gently after time $t_1$.

In addition, as shown in FIG. 3(*a*), after time $t_1$, the load control unit 640 performs control so that the voltage of the minimum voltage cell reaches a value larger than the over-discharge detection voltage value $V_{OD}$, on the basis of the first signal. Thereby, after time $t_1$, the voltage of the minimum voltage cell, for example, drops gently. When the discharge current is not reduced by the load control unit 640, the voltage of the minimum voltage cell has the possibility of reaching the over-discharge detection voltage value $V_{OD}$ at time $t_2$. On the other hand, in S150, the load control unit 640 reduces the discharge current. Thereby, from time $t_1$ to time $t_3$, the voltage of the minimum voltage cell can be maintained higher than the over-discharge detection voltage value $V_{OD}$. Therefore, it is possible to prevent the minimum voltage cell from being over-discharged.

In S150, the load control unit 640 may cause a display unit (not shown) of the electronic device 60 to perform a display for making known that the residual capacity of the battery pack 10 is low. Thereby, it is possible to prepare a user for the electronic device 60 not being able to be used.

In addition, in S150, the load control unit 640 may perform control so that the discharge current is set to be equal to or greater than a minimum current value required for bringing the electronic device 60 into operation. Thereby, it is possible to use the electronic device 60 for a long time.

When further discharge is performed, as shown in FIG. 3(*a*), the voltage of the minimum voltage cell is set to the discharge termination voltage value $V_0$ at time $t_3$. In addition, in this case, as shown in FIG. 3(*b*), the residual capacity of the minimum voltage cell is set to $C_{a0}$. In this manner, for example, when the voltage of the minimum voltage cell is set to the discharge termination voltage value $V_0$, the battery control unit 400 terminates the discharge (S160).

On the other hand, the user side may terminate the use of the electronic device 60 arbitrarily (S160).

As described above, the discharge of the battery pack 10 according to the first exemplary embodiment is controlled.

Next, an effect of the first exemplary embodiment will be described using FIG. 4 as a comparative example. FIG. 4 is a diagram illustrating a comparative example for describing the effect of the first exemplary embodiment.

Unlike the first exemplary embodiment, FIG. 4 shows a comparative example in which the battery control unit 400 does not perform control of the discharge of the minimum voltage cell. FIG. 4(*a*) shows a relationship between the time from the discharge start time and the voltage of the minimum voltage cell in the comparative example. In addition, FIG. 4(*b*) shows a relationship between the time from the discharge start time and the residual capacity of the minimum voltage cell in the comparative example, and a relationship between the time from the discharge start time and the current of the minimum voltage cell. Meanwhile, time t of FIG. 4 is assumed to be the same as time t of FIG. 3. In addition, the discharge current is assumed to be the constant current value $I_D$ and to be constant.

Here, in the comparative example, it is also assumed that a variation occurs in the voltage of each of the battery cells 100 due to a difference in internal resistance. Similarly, in this case, the battery cell 100 having the largest internal resistance is a "minimum voltage cell".

As shown in FIG. 4(*a*), in the comparative example, the voltage of the minimum voltage cell drops monotonically from the discharge start. Since the minimum voltage cell has a large internal resistance, the voltage drop of the minimum voltage cell is faster than those of other battery cells 100. In addition, in the comparative example, the battery control unit 400 does not perform control for reducing the discharge current as in the first exemplary embodiment. Therefore, the voltage of the minimum voltage cell continues to drop with reduction in residual capacity even when the voltage becomes lower than the discharge reference voltage value $V_2$.

At time $t_2$, the voltage of the minimum voltage cell further drops to the over-discharge detection voltage value $V_{OD}$. The voltage of the minimum voltage cell reaches the over-discharge detection voltage value $V_{OD}$ faster than those of other battery cells 100. In this manner, when the voltage of the minimum voltage cell drops to the over-discharge detection voltage value $V_{OD}$, the battery control unit 400 transmits a signal for stopping discharge to the switch 500 through the measurement unit 200. Thereby, the battery control unit 400 terminates the discharge forcibly.

In addition, as shown in FIG. 4(*b*), the residual capacity of the minimum voltage cell is reduced linearly. At time $t_2$, as described above, the voltage of the minimum voltage cell drops to the over-discharge detection voltage value $V_{OD}$. For this reason, the discharge of the minimum voltage cell is terminated forcibly in a state where the residual capacity $C_{a1}$ remains. In addition, at a point of time $t_2$, other battery cells 100 are also left in a state where residual capacity remains.

In this manner, in the comparative example, there is the possibility of the discharge being terminated forcibly in a state where a large amount of residual capacity remains, in a whole of the battery pack 10, due to the voltage of a specific battery cell 100.

On the other hand, according to the first exemplary embodiment, when the discharge of the battery cells 100 is performed, the battery control unit 400 outputs the first signal for reducing a discharge current in the discharge before the minimum voltage cell is over-discharged. Thereby, it is possible to reduce a discharge current with respect to the electronic device 60 connected to the battery pack 10. Therefore, a case where the minimum voltage cell is over-discharged does not occur. In this manner, it is possible to prevent the termination of discharge due to the voltage of a specific battery cell.

In addition, for example, when the load control unit 640 of the electronic device 60 reduces a discharge current consumed in the load 600, the voltage drop due to the internal resistance of the minimum voltage cell is reduced. Thereby, it is possible to discharge the minimum voltage cell stably and for a long time. In other words, it is possible to delay the voltage of the minimum voltage cell reaching the over-discharge detection voltage value $V_{OD}$.

As described above, according to the first exemplary embodiment, it is possible to prevent the battery pack 10 including the plurality of battery cells 100 connected in series to each other from being over-discharged, and to discharge the battery pack stably and for a long time.

As described above, in the first exemplary embodiment, a case where the electronic device 60 is a liquid crystal display device has been described, but the electronic device may be a display device including a plurality of light-emitting units such as an organic EL element as pixels. In this case, when the load control unit 640 receives the first signal, it is possible to reduce, for example, a current flowing through all the light-emitting units.

As described above, in the first exemplary embodiment, a case where the internal resistances of the respective battery cells 100 are different from each other has been described, but it is possible to obtain the same effect even in a case where the full charge capacities of the respective battery cells 100 are different from each other.

Second Exemplary Embodiment

A second exemplary embodiment will be described with reference to FIG. 5. FIG. 5 is a diagram illustrating a discharge control method according to the second exemplary embodiment. The second exemplary embodiment is the same as the first exemplary embodiment, except that the content of S150 is different. Hereinafter, a detailed description will be given.

The same battery pack 10 can be used in the second exemplary embodiment as in the first exemplary embodiment. In addition, the electronic device 60 is, for example, a display device as is the case with the first exemplary embodiment.

Here, FIG. 5(a) shows a relationship between the time from the discharge start time and the voltage of the minimum voltage cell in the second exemplary embodiment. In addition, FIG. 5(b) shows a relationship between the time from the discharge start time and the residual capacity of the minimum voltage cell in the second exemplary embodiment, and a relationship between the time from the discharge start time and the current of the minimum voltage cell.

As shown in FIG. 5(a), at time $t_1$, the voltage of the minimum voltage cell becomes equal to or less than the discharge reference voltage value $V_1$. Therefore, when the voltage of the minimum voltage cell becomes equal to or less than the discharge reference voltage value $V_1$ and the alarm condition is satisfied (S130; Yes), the battery control unit 400 outputs the first signal for reducing a discharge current in the discharge (S140).

In addition, as shown in FIG. 5(b), at time $t_1$, the residual capacity of the minimum voltage cell is $C_{a1}$, and has not reached a full charge capacity 0. Meanwhile, the residual capacities of all the battery cells 100 also remain yet.

Next, when the first signal is received from the battery control unit 400 at time $t_1$, the load control unit 640 reduces the discharge current (S150). In this case, the load control unit 640 controls the load 600 so that the voltage of the minimum voltage cell is kept constant at the discharge reference voltage value $V_1$, on the basis of the first signal. In this case, the "first signal" is a signal corresponding to the present voltage value of the minimum voltage cell. The load control unit 640 drops the power consumption of the load 600 while referring to the first signal. Thereby, the load control unit 640 can reduce the discharge current while fixing the voltage of the minimum voltage cell.

As shown in FIG. 5(a), after time $t_1$, the voltage of the minimum voltage cell is kept constant at the discharge reference voltage value $V_1$ by the control of the load control unit 640.

In addition, as shown in FIG. 5(b), after time $t_1$, the current is reduced drastically by the control of the load control unit 640. In addition, the residual capacity of the minimum voltage cell is reduced gently.

Next, as shown in FIG. 5(b), at time $t_3$, the voltage of the minimum voltage cell drops to the discharge termination voltage value $V_0$. In addition, at this time, the capacity of the minimum voltage cell is set to $C_{a0}$. For this reason, the battery control unit 400 terminates discharge (S160). On the other hand, when the discharge is desired to be terminated in a state where the voltage of the minimum voltage cell is maintained at the discharge reference voltage value $V_1$, or the like, the load control unit 640 may stop the load 600. Alternatively, the user side may terminate the use of the electronic device 60.

As described above, the discharge control according to the second exemplary embodiment is performed.

According to the second exemplary embodiment, it is possible to obtain the same effect as that in the first exemplary embodiment. Further, according to the second exemplary embodiment, the load control unit 640 controls the load 600 so that the voltage of the minimum voltage cell is kept constant at the discharge reference voltage value $V_1$, on the basis of the first signal. Thereby, when a predetermined voltage or higher is required for driving the load 600, it is possible to lengthen the drive time. In addition, it is possible to suppress a deterioration in the minimum voltage cell without making the minimum voltage cell be in a state close to over-discharge.

Third Exemplary Embodiment

Figure 6:
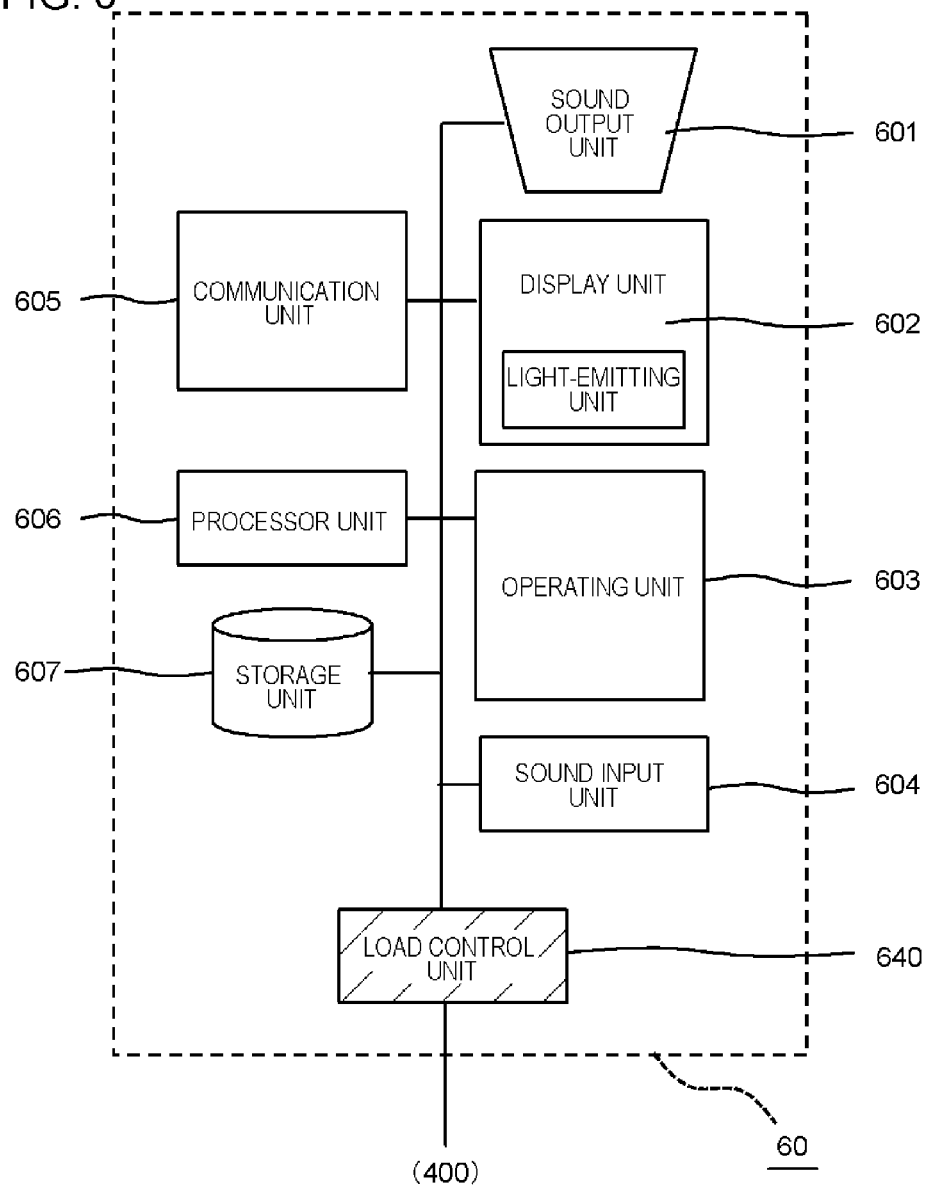
FIG. 6 is a schematic diagram illustrating a configuration of an electronic device according to a third exemplary embodiment.

FIG. 6 is a schematic diagram illustrating a configuration of an electronic device 60 according to a third exemplary embodiment. The third exemplary embodiment is the same as the first exemplary embodiment, except that there are a plurality of loads 600. Hereinafter, a detailed description will be given.

Here, as shown in FIG. 6, the electronic device 60 according to the third exemplary embodiment is, for example, a portable communication terminal that performs a phone call or packet communication through the transmission and reception of electromagnetic waves.

This electronic device 60 includes a sound output unit 601, a display unit 602 provided with a light-emitting unit, an operating unit 603, a sound input unit 604, a communication unit (communication unit 605), a processor unit (processor unit 606), a storage unit 607 and a load control unit 640.

The sound output unit 601 is a speaker that outputs a sound of a phone call. In addition, the sound input unit 604 is a microphone that inputs a sound of a phone call. In addition, the display unit 602 provided with a light-emitting unit is a liquid crystal display device that displays characters and images such as a phone number or a mail. In addition, the processor unit 606 performs an arithmetic operation process on a signal such as a sound signal of a phone call or data of packet communication. The storage unit 607 stores data such as a phone number or a mail. The communication unit 605 transmits and receives a signal such a sound signal or packets through electromagnetic waves. In this manner, the electronic device 60 of the third exemplary embodiment includes a plurality of loads 600.

The load control unit 640 is connected to the same battery pack 10 as that in the first exemplary embodiment, in a region which is not shown in the drawing. In addition, the load control unit 640 is connected to each of the loads 600 mentioned above. Thereby, the load control unit 640 can control the amount of power consumption of each of the loads 600.

Meanwhile, an interconnect (not shown) for supplying power to each of the loads 600 may not necessarily be connected to each of the loads 600 through the load control unit 640.

Here, a state of S140 in FIG. 2 is assumed. That is, this state is a state where an alarm condition that the voltage of the minimum voltage cell in the battery pack 10 is equal to or less than the discharge reference voltage value $V_1$ is satisfied, and the battery control unit 400 transmits the first signal to the load control unit 640.

When all the loads 600 are continuously used as they are, the minimum voltage cell of the battery pack 10 is changed to be in a state of over-discharge quickly. Consequently, when the first signal is received from the battery control unit 400, the load control unit 640 reduces the discharge current of the loads 600 as follows.

For example, as is the case with the first exemplary embodiment, the load control unit 640 gradually drops the luminance of the light-emitting unit of the display unit 602. In this manner, the load control unit 640 gradually reduces the discharge current consumed in the loads 600.

In addition, for example, as is the case with the first exemplary embodiment, the load control unit 640 may cause the display unit 602 to perform a display for making known that the residual capacity of the battery pack 10 is low. Thereby, it is possible to prepare a user for the electronic device 60 not being able to be used.

In addition, for example, the load control unit 640 lowers the processing speed of the processor unit 606. Here, "lowers the processing speed of the processor unit 606" is to lower the clock frequency of the processor unit 606. In this manner, it is possible to reduce a current consumed in the processor unit 606 by lowering the clock frequency.

In addition, for example, the load control unit 640 controls the communication unit 605 so as to restrict a phone call and perform only packet communication. In the transmission and reception of a sound signal through a phone call, power consumed in the communication unit 605 is greater than in the transmission and reception of a data signal through packet communication. In this manner, the load control unit 640 can impose a restriction of using only the load 600 having relatively small power consumption.

As described above, the load control unit 640 may gradually reduce the number of loads 600 that consume power at the present time. Thereby, it is possible to reduce the discharge current in units of the loads 600.

According to the third exemplary embodiment, the electronic device 60 includes the plurality of loads 600. In such a case, when the first signal is received from the battery control unit 400, the load control unit 640 can appropriately select a method of reducing a discharge current. The load control unit 640 may gradually reduce the number of loads 600 that consume power at the present time. Thereby, it is possible to reduce the discharge current in units of the loads 600. Therefore, it is possible to prevent the entire electronic device 60 from not being able to be used due to the over-discharge of the minimum voltage cell. In addition, a user can use the electronic device 60 stably and for a long time.

Fourth Exemplary Embodiment

Figure 7:
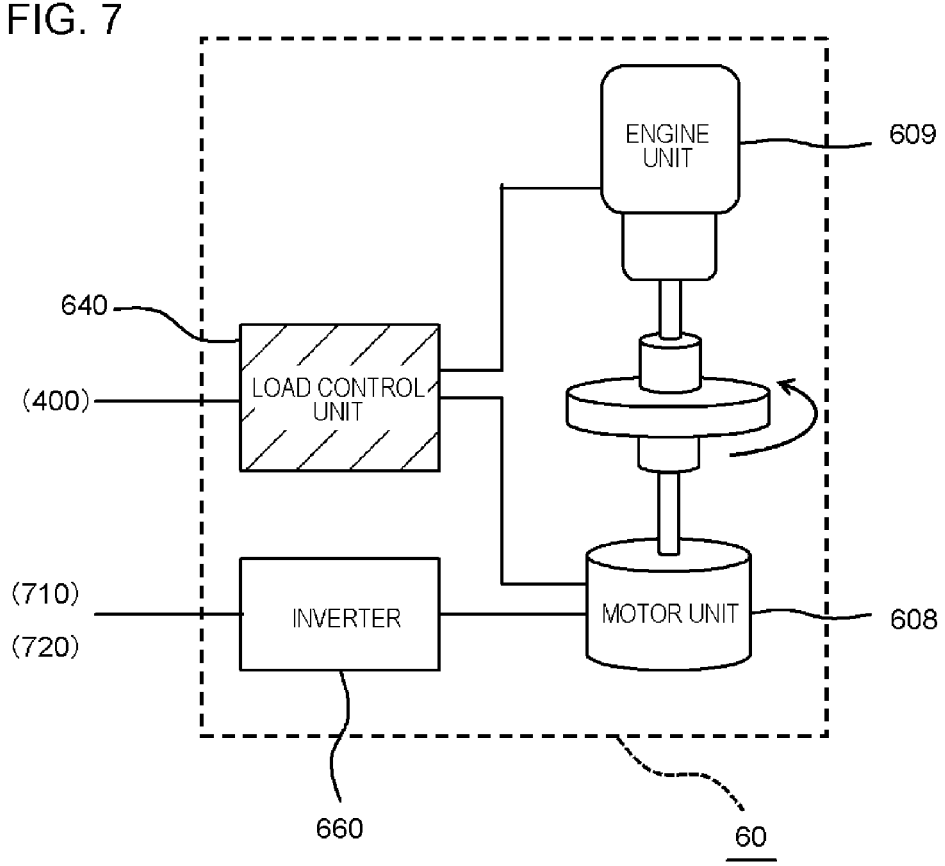
FIG. 7 is a schematic diagram illustrating a configuration of an electronic device according to a fourth exemplary embodiment.

FIG. 7 is a schematic diagram illustrating a configuration of an electronic device 60 according to a fourth exemplary embodiment. The fourth exemplary embodiment is the same as the first exemplary embodiment, except that the electronic device 60 is a motive power control device of a hybrid car or an electric automobile. Hereinafter, a detailed description will be given.

Here, as shown in FIG. 7, the electronic device 60 according to the fourth exemplary embodiment is, for example, a motive power control device such as a hybrid car. The same battery pack 10 as that in the first exemplary embodiment is mounted on the hybrid car, and is connected to the electronic device 60.

The electronic device 60 includes a motor unit (motor unit 608), an engine unit (engine unit 609), a load control unit 640 and an inverter 660. The load control unit 640 is connected to the battery control unit 400 of the battery pack 10, in a region which is not shown in the drawing. In addition, the inverter 660 is connected to the external positive electrode terminal 710 and the external negative electrode terminal 720 of the battery pack 10, in a region which is not shown in the drawing.

The motor unit 608 converts power from the battery pack 10 into motive power of an automobile. In addition, the motor unit 608 converts the motive power of an automobile into power through the inverter 660, and can supply the converted power to the battery pack 10.

The engine unit 609 provides motive power to an automobile by burning gasoline. The load control unit 640 is connected to the motor unit 608 and the engine unit 609. Thereby, the load control unit 640 controls a ratio by which each of the loads 600 contributes to the motive power of an automobile.

Meanwhile, an interconnect (not shown) for supplying power to the motor unit 608 may not necessarily be connected through the load control unit 640.

Here, the hybrid car is driven by the motor unit 608, and is assumed to be in a state of S140 in FIG. 2. That is, the hybrid car is in a state where an alarm condition that the voltage of the minimum voltage cell in the battery pack 10 is equal to or less than the discharge reference voltage value $V_1$ is satisfied, and the battery control unit 400 transmits the first signal to the load control unit 640.

When only the motor unit 608 continues to be driven as it is, the minimum voltage cell of the battery pack 10 is over-discharged quickly. Consequently, when the first signal is received from the battery control unit 400, the load control unit 640 performs control as follows.

For example, the load control unit 640 reduces the power supply amount from the battery pack 10 to the motor unit 608, and increases a drive ratio in the engine unit 609. In other words, the load control unit 640 performs control so that the contribution ratio to motive power becomes gradually larger in the engine unit 609. Meanwhile, the drive may be switched from the motor unit 608 to the engine unit 609. Thereby, it is possible to reduce a discharge current consumed in the motor unit 608. In this manner, it is possible to perform gradual switching to the load 600 (engine unit 609) using other energy.

According to the fourth exemplary embodiment, it is possible to obtain the same effect as that in the first exemplary embodiment.

As described above, in the fourth exemplary embodiment, a case of the hybrid car has been described, but an electric automobile may be used. In this case, when the first signal is received from the battery control unit 400, the load control unit 640 reduces a discharge current by reducing power which is supplied to the motor unit 608. Meanwhile, in this case, since there is only one motive power source, it is preferable that the load control unit 640 gradually reduce the discharge current.

In addition, in the fourth exemplary embodiment, a case of the hybrid car has been described, but an electric power-assisted bicycle may be used. As described in the first exemplary embodiment, when the minimum voltage cell is over-discharged, the battery pack 10 terminates discharge forcibly. Consequently, when the first signal is received from the battery control unit 400, the load control unit 640 gradually reduces the power which is supplied to the motor unit 608. That is, the load control unit 640 weakens an assist force of the motor unit 608. Thereby, it is possible to use the motor unit 608 over a long period of time with little change in load felt by a user.

Fifth Exemplary Embodiment

Figure 8:
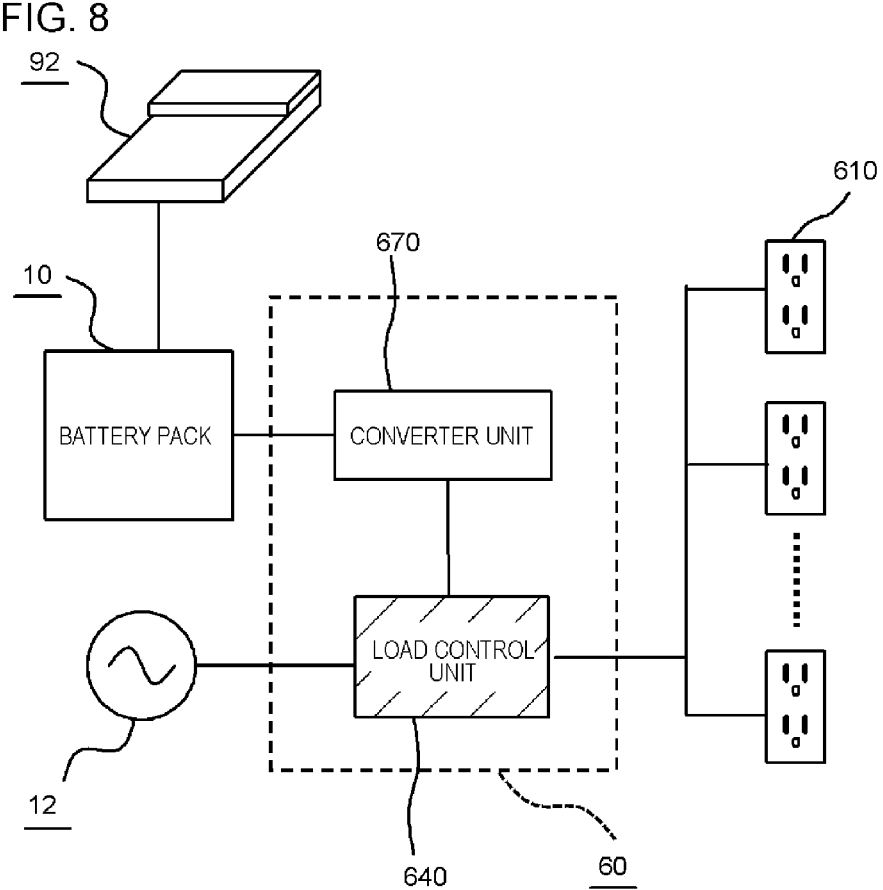
FIG. 8 is a schematic diagram illustrating a configuration of an electronic device according to a fifth exemplary embodiment.

FIG. 8 is a schematic diagram illustrating a configuration of an electronic device 60 according to a fifth exemplary embodiment. The fifth exemplary embodiment is the same as the first exemplary embodiment, except that the electronic device 60 is connected to at least one or more other power supply units (power supply units 12) other than the battery pack 10. Hereinafter, a detailed description will be given.

Here, as shown in FIG. 8, the electronic device 60 according to the fifth exemplary embodiment is, for example, a power control device that controls power from a plurality of power supply sources.

The same battery pack 10 as that in the first exemplary embodiment is connected to a solar battery 92. The solar battery 92 converts light energy of sunlight into power. When photovoltaic power is supplied from the solar battery 92, the battery pack 10 is charged by the power.

In addition, the electronic device 60 includes a converter unit 670 and a load control unit 640. The converter unit 670 converts a direct current supplied from the battery pack 10 into an alternating current. In addition, the converter unit 670 has a function of transmitting a first signal which is transmitted from the battery pack 10. Meanwhile, an interconnect (not shown) for transmitting the first signal from the battery pack 10 directly to the load control unit 640 may be connected thereto. In addition, the battery pack 10 is connected to the converter unit 670 of the electronic device 60.

The load control unit 640 is connected to other power supply units 12. The power supply unit 12 is, for example, a distribution switchboard of power which is supplied from an electric power company. For example, an alternating current is supplied from the power supply unit 12.

The load control unit 640 is connected to a plurality of household power supply receptacles 610. Various loads 600 are connected to the power supply receptacles 610 by a user.

Here, it is assumed that power is supplied to the power supply receptacles 610 from the battery pack 10. In addition, the battery pack 10 is assumed to be in a state of S140 in FIG. 2. That is, the battery pack is in a state where an alarm condition that the voltage of the minimum voltage cell in the battery pack 10 is equal to or less than the discharge reference voltage value $V_1$ is satisfied, and the battery control unit 400 transmits the first signal to the load control unit 640.

When power is continuously consumed only from the battery pack 10 as it is, the minimum voltage cell of the battery pack 10 is over-discharged quickly.

Consequently, when the first signal is received from the battery control unit 400, the load control unit 640 reduces the power supply amount from the battery pack 10 to the power supply receptacles 610, and increases the power supply amount from other power supply units 12 to the power supply receptacles 610. Thereby, it is possible to prevent the minimum voltage cell of the battery pack 10 from being over-discharged.

Meanwhile, a ratio by which the other power supply units 12 contribute may be gradually increased without discontinuously switching from the battery pack 10 to other power supply units 12.

According to the fifth exemplary embodiment, the electronic device 60 is connected to at least one or more other power supply units 12 other than the battery pack 10. As also described in the first exemplary embodiment, when the minimum voltage cell is over-discharged, the battery pack 10 terminates discharge forcibly. For this reason, for example, when a user receives a supply of power from the battery pack 10, a failure of power supply occurs instantaneously. Therefore, when the first signal is received, the load control unit 640 reduces the power supply amount from the battery pack 10 to the power supply receptacles 610, and increases the power supply amount from other power supply units 12 to the power supply receptacles 610. Thereby, it is possible to prevent the minimum voltage cell of the battery pack 10 from being over-discharged. In addition, it is possible to continuously supply power to the load 600 side.

Sixth Exemplary Embodiment

Figure 9:
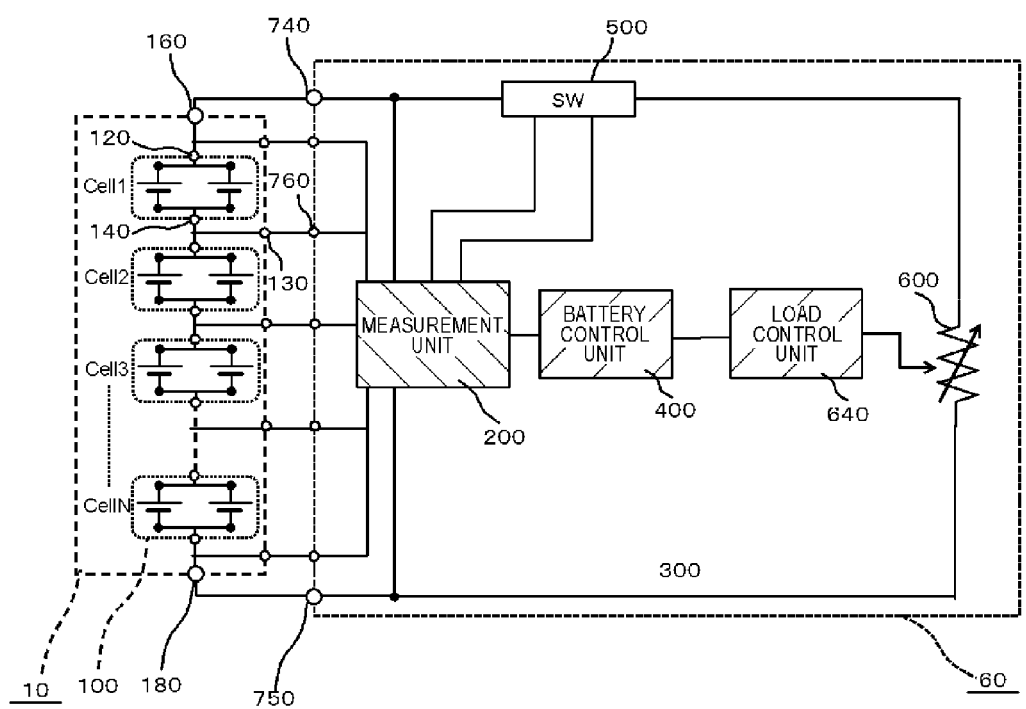
FIG. 9 is a circuit diagram illustrating a configuration of a battery pack and an electronic device according to a sixth exemplary embodiment.

FIG. 9 is a circuit diagram illustrating a configuration of a battery pack 10 and an electronic device 60 according to a sixth exemplary embodiment. The sixth exemplary embodiment is the same as the first exemplary embodiment, except that the control circuit 20 of the battery pack 10 in the first exemplary embodiment is included in the electronic device 60. Hereinafter, a detailed description will be given.

As shown in FIG. 9, the battery pack 10 of the sixth exemplary embodiment is not provided with the control circuit 20. That is, the battery pack 10 includes only a plurality of battery cells 100 which are connected in series to each other. The positive electrode terminal 160 is provided on the side of Cell 1 of the battery pack 10. On the other hand, the negative electrode terminal 180 is provided on the side of Cell N of the battery pack 10. In addition, a battery cell terminal 130 is provided between each of the battery cells 100.

The electronic device 60 of the sixth exemplary embodiment includes the measurement unit 200, the battery control unit 400 and the switch 500 in addition to the load 600 and the load control unit 640. A measurement terminal 760 is provided on the battery pack 10 side of the electronic device 60.

In addition, a positive electrode terminal 740 and a negative electrode terminal 750 are provided on the battery pack 10 side of the electronic device 60. The positive electrode terminal 740 and the negative electrode terminal 750 of the electronic device 60 are respectively connected to the positive electrode terminal 160 and the negative electrode terminal 180 of the battery pack 10. Thereby, the electronic device 60 can receive a supply of power from the battery pack 10.

In addition, the measurement unit 200 is connected to the measurement terminal 760. The measurement terminal 760 of the electronic device 60 is connected to the battery cell terminal 130 of the battery pack 10 through an interconnect (no sign shown). Thereby, the measurement unit 200 can measure the voltage of each of the battery cells 100.

According to the sixth exemplary embodiment, it is possible to obtain the same effect as that in the first exemplary embodiment. Further, according to the sixth exemplary embodiment, it is possible to simplify the battery pack 10 which is frequently exchanged.

Seventh Exemplary Embodiment

Figure 10:
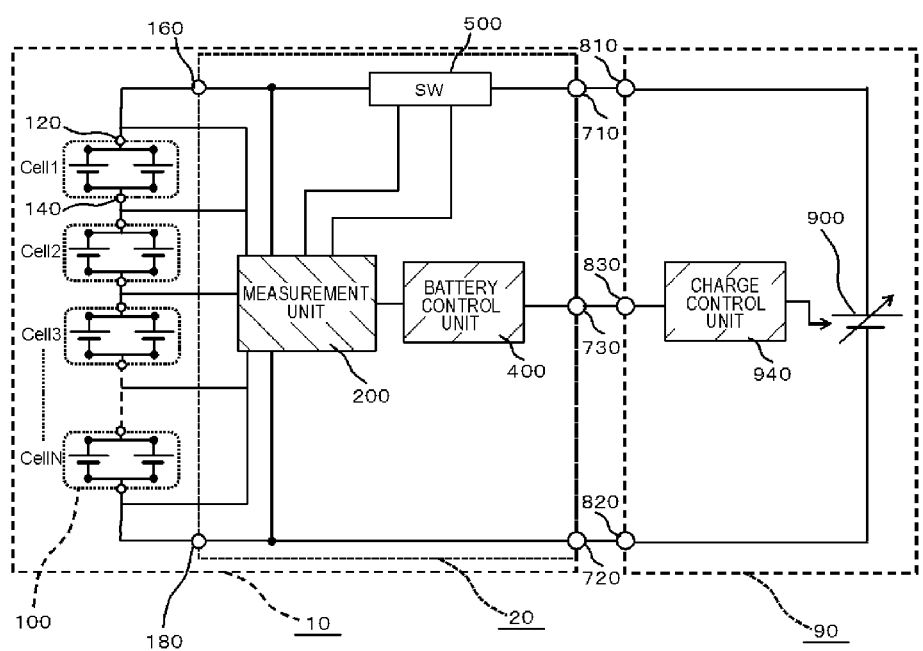
FIG. 10 is a circuit diagram illustrating a configuration of a battery pack and a charger according to a seventh exemplary embodiment.

A battery pack 10 according to a seventh exemplary embodiment will be described with reference to FIG. 10. FIG. 10 is a circuit diagram illustrating a configuration of the battery pack 10 according to the first exemplary embodiment and a charger 90. The seventh exemplary embodiment is the same as the first exemplary embodiment, except for a function of the battery control unit 400. The configuration of the battery pack 10 is the same as that in the first exemplary embodiment. In the configuration, the battery control unit 400 controls charge of the battery cells 100 on the basis of the voltages measured by the measurement unit 200. In addition, when the charge of the battery cells 100 is performed, the battery control unit 400 specifies a maximum voltage cell having the highest voltage on the basis of the voltages measured by the measurement unit 200. Further, before a minimum capacity unit is over-charged, the battery control unit 400 outputs a first signal for reducing a charge current in the charge. Hereinafter, a detailed description will be given.

The battery control unit 400 is connected to the measurement unit 200. The battery control unit 400 controls charge of each of the battery cells 100 on the basis of the voltages measured by the measurement unit 200.

Here, as is the case with the first exemplary embodiment, it is assumed that a difference in internal resistance occurs in each of the battery cells 100, for example, due to the occurrence of a temperature difference. In this case, the voltage drop component of the battery cell 100 having the smallest internal resistance is smaller than those of other battery cells 100. That is, when the battery pack 10 is charged, the maximum voltage cell has a rise in voltage during charge faster than other battery cells 100. Therefore, when the charge of the battery cells 100 is performed, the battery control unit 400 specifies this battery cell 100 having the smallest internal resistance as a "maximum voltage cell", on the basis of the voltages measured by the measurement unit 200. The details of a charge method according to the seventh exemplary embodiment will be described later.

Next, the charger 90 connected the battery pack 10 of the seventh exemplary embodiment will be described. The electronic device 60 includes a charge control unit (charge control unit 940). The charge control unit 940 is connected to the battery control unit 400, and controls a charge voltage and a charge current in the charge. In addition, when the first signal is received from the battery control unit 400, the charge control unit 940 reduces the charge current. Hereinafter, a detailed description will be given.

The charger 90 includes, for example, a power supply source 900. The power supply source 900 as used herein is a power source for charging the battery pack 10. The positive electrode terminal 810 and the negative electrode terminal 820 of the charger 90 are connected to the power supply source 900. Meanwhile, when the power supply source 900 is an alternating current, the charger 90 may include a converter unit (not shown) that converts an alternating current into a direct current. In addition, the power supply source 900 may be an external power supply source different from that of the charger 90.

The positive electrode terminal 810 and the negative electrode terminal 820 are provided on the battery pack 10 side of the charger 90. The positive electrode terminal 810 and the negative electrode terminal 820 of the charger 90 are respectively connected to the external positive electrode terminal 710 and the external negative electrode terminal 720 of the battery pack 10. Thereby, the charger 90 can charge the battery pack 10.

The charge control unit 940 is connected to the power supply source 900. Thereby, the charge control unit 940 controls the voltage and current of the power supply source 900.

In addition, the charge control unit 940 is connected to the communication terminal 830. The communication terminal 830 on the charger 90 side is connected to the communication terminal 730 on the battery pack 10 side, for example, through an interconnect (no sign shown). Thereby, the charge control unit 940 is connected to the battery control unit 400, and can receive the first signal.

When the first signal is received from the battery control unit 400, the charge control unit 940 reduces a charge current. Thereby, it is possible to prevent the maximum voltage cell from being over-charged. The details of this charge control method will be described later.

Figure 11:
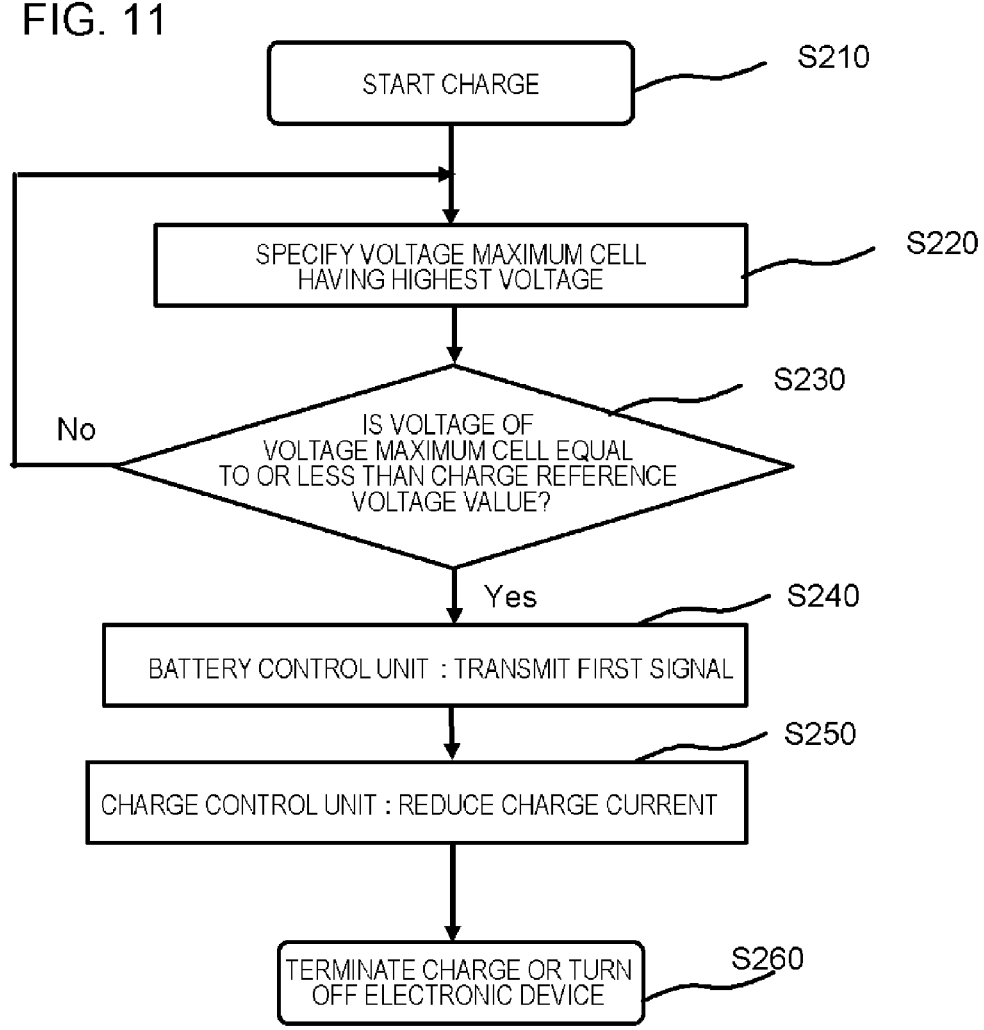
FIG. 11 is a flow diagram illustrating a charge control method according to the seventh exemplary embodiment.

Next, the charge control method of the battery pack 10 mentioned above will be described with reference to FIGS. 11 and 12. FIG. 11 is a flow diagram illustrating a charge control method according to the seventh exemplary embodiment. FIG. 12 is a diagram illustrating the charge control method according to the seventh exemplary embodiment. Meanwhile, time t of FIG. 12 is independent of time t of FIGS. 3 and 4. The charge control method according to the seventh exemplary embodiment includes the following steps. First, when the battery cell 100 is charged, the maximum voltage cell having the highest voltage is specified on the basis of the voltages measured by the measurement unit 200 (S220). Next, before the maximum voltage cell is over-charged, the first signal for reducing a charge current in the charge is output (S240). Hereinafter, a detailed description will be given.

Here, it is assumed that the residual capacity of at least the maximum voltage cell is not present in the battery pack 10. The voltage of the maximum voltage cell in an initial step becomes a value close to the discharge termination voltage value $V_0$. The voltage is, for example assumed to be the discharge reference voltage value $V_1$.

First, in FIG. 11, the positive electrode terminal 810 and the negative electrode terminal 820 of the charger 90 are respectively connected to the external positive electrode terminal 710 and the external negative electrode terminal 720 of the battery pack 10. Thereby, the charge of the battery cells 100 is started (S210).

This charge is performed by a constant-current and constant-voltage charging method. The "constant-current and constant-voltage charging method" as used herein is a charging method in which the charge is performed with a constant charge current until the voltage of the entire battery pack 10 reaches a specific charge voltage, and an applied voltage is set to a constant charge voltage after reaching the specific charge voltage. Here, for example, the above-mentioned "charge voltage" is set to $NV_2$ so that the voltage of the battery cell 100 is set to a charge reference voltage value $V_2$. In addition, the "charge current" is set to $I_C$.

In addition, simultaneously with the charge start, the measurement unit 200 measures the voltages of the plurality of battery cells 100 which are connected in series to each other. In addition, simultaneously, the current of the battery cell 100 may also be measured.

Next, the battery control unit 400 specifies the maximum voltage cell having the highest voltage on the basis of the voltages measured by the measurement unit 200 (S220).

Here, FIG. 12(a) shows a relationship between the time from the charge start time and the voltage of the maximum voltage cell in the seventh exemplary embodiment. The voltage of the battery cell 100 rises monotonically due to the charge. All the battery cells 100 including the maximum voltage cell are connected in series to each other. For this reason, the currents flowing through the respective battery cells 100 are all equal to each other. On the other hand, the internal resistances of the respective battery cells 100 are different from each other. For example, the internal resistance of the battery cell 100 having the highest temperature is smallest. Since a voltage drop due to the internal resistance is proportional to a current, the voltage drop component of the battery cell 100 having the smallest internal resistance is smaller than those of other battery cells 100. That is, a rise in the voltage of the maximum voltage cell is faster than those in other battery cells 100. Therefore, the battery cell 100 having the smallest internal resistance is specified as a "maximum voltage cell".

In addition, FIG. 12(b) shows a relationship between the time from the charge start time and the residual capacity of the maximum voltage cell in the seventh exemplary embodiment, and a relationship between the time from the discharge start time and the current of the maximum voltage cell.

In FIG. 12(b), until time $t_1$, constant current charge is performed. The charge current is kept constant at $I_C$. In addition, the residual capacity of each of the battery cells 100 rises linearly.

Meanwhile, in the initial step of the charge, the battery cell 100 corresponding to the maximum voltage cell may change. In that case, the battery cell 100 having the highest voltage at the present time is specified as a "maximum voltage cell", and the specified "maximum voltage cell" may be changed on the basis of the voltages measured at any time.

Next, after the minimum voltage cell is specified, the battery control unit 400 determines an alarm condition that the voltage of the maximum voltage cell is equal to or less than the charge reference voltage value $V_2$ (S230). This "charge reference voltage value $V_2$" is a reference voltage, as described later, for determining that the maximum voltage cell is close to over-charge. Meanwhile, the "charge reference voltage value $V_2$" is stored in the storage unit of the battery control unit 400.

Here, the "charge reference voltage value $V_2$" is set to be lower than an over-charge detection voltage value $V_{OC}$. Specifically, the "charge reference voltage value $V_2$" is, for example, a rated charge voltage value. Thereby, since the maximum voltage cell is not over-charged, it is possible to suppress a deterioration in maximum voltage cell. Meanwhile, the "rated charge voltage value" as used herein refers to a chargeable voltage value which is set to be lower than the over-charge detection voltage value $V_{OC}$ in consideration of safety when the battery pack 10 is charged.

The "over-charge detection voltage value $V_{OC}$" as used herein refers to an upper limit of a voltage for causing a defect not to occur, for example, in a lithium-ion secondary battery or the like. When the maximum voltage cell reaches the "over-charge detection voltage value $V_{OC}$", the charge of the battery pack 10 is terminated forcibly. Specifically, the battery control unit 400 transmits a signal for stopping the charge to the switch 500 through the measurement unit 200. Thereby, the battery control unit performs control so that the maximum voltage cell is not over-charged. Meanwhile, the "over-charge detection voltage value $V_{OC}$" is stored in the storage unit of the battery control unit 400.

As in a case before time $t_1$, when the voltage of the maximum voltage cell is lower than the charge reference voltage value $V_2$, and the alarm condition is not satisfied (S230; No), the battery control unit 400 continues to charge all the battery cells 100 as they are.

On the other hand, when the voltage of the maximum voltage cell reaches the charge reference voltage value $V_2$ or higher, and the alarm condition is satisfied (S230; Yes), the battery control unit 400 outputs the first signal for reducing a charge current in the charge (S240). The first signal is transmitted to the charge control unit 940 of the charger 90 through the communication terminal 730 of the battery pack 10 and the communication terminal 830 of the charger 90.

The "first signal" as used herein refers to a signal in order for the battery control unit 400 to reduce a charge current on the charger 90 side. The "first signal" in the seventh exemplary embodiment can be set to the same signal as the "first signal" in the first exemplary embodiment, except that the signal is a signal relating to charge.

Here, in FIGS. 12(a) and 12(b), the time when the alarm condition is satisfied (S230; Yes) is time $t_1$. As shown in FIG. 12(a), the voltage of the maximum voltage cell is set to the charge reference voltage value $V_2$. Therefore, the voltage of the maximum voltage cell is in a state where the alarm condition is satisfied. Meanwhile, although not shown in the drawing, at time $t_1$, the voltages of other battery cells 100 are equal to or less than the charge reference voltage value $V_2$.

In addition, as shown in FIG. 12(b), at time $t_1$, the residual capacity of the maximum voltage cell has not yet reached a full charge capacity $C_{Ra}$. Meanwhile, all the battery cells 100 are also yet in a state of not being fully charged.

Next, when the first signal is received from the battery control unit 400 at time $t_1$, the charge control unit 940 reduces the charge current (S250).

As shown in FIG. 12(b), after time $t_1$, the charge control unit 940 gradually reduces the charge current from $I_C$. In this case, the residual capacity of the maximum voltage cell rises gently after time $t_1$.

In addition, as shown in FIG. 12(a), after time $t_1$, the charge control unit 940 performs control so that the voltage of the maximum voltage cell becomes less than the over-charge detection voltage value $V_{OC}$, on the basis of the first signal. Specifically, the charge control unit 940 performs control so that the voltage is kept constant, for example, at the charge reference voltage value $V_2$. When the charge current is not reduced by the charge control unit 940, there is the possibility of the voltage of the maximum voltage cell reaching the over-charge detection voltage value $V_{OC}$ at time $t_2$. On the other hand, in S250, the charge control unit 940 reduces the charge current. Thereby, from time $t_1$ to time $t_2$, the voltage of the maximum voltage cell can be maintained lower than over-charge detection voltage value $V_{OC}$. Therefore, it is possible to prevent the maximum voltage cell from being over-charged.

Further, the charge is performed, and thus as shown in FIG. 12(b), the residual capacity of the maximum voltage cell reaches the full charge capacity $C_{Ra}$ at time $t_3$. In addition, at time $t_3$, the current of the maximum voltage cell reaches a charge termination current value $I_0$. The "charge termination current value $I_0$" as used herein refers to a current value at the time of convergence on a constant value when the battery cell 100 comes close to full charge. Therefore, at time $t_3$, the charge control unit 940 terminates the charge (S260).

On the other hand, the user side may terminate the use of the electronic device 60 arbitrarily (S260).

As described above, the discharge of the battery pack 10 according to the seventh exemplary embodiment is controlled.

Next, an effect of the seventh exemplary embodiment will be described using FIG. 13 as a comparative example. FIG. 13 is a diagram illustrating a comparative example for describing the effect of the seventh exemplary embodiment.

Unlike the seventh exemplary embodiment, FIG. 13 shows a comparative example in which the battery control unit 400 does not perform control of the charge of the maximum voltage cell. FIG. 13(a) shows a relationship between the time from the charge start time and the voltage of the battery cell 100 in the comparative example. In addition, FIG. 13(*b*) shows a relationship between the time from the charge start time and the residual capacity of the battery cell 100 in the comparative example, and a relationship between the time from the charge start time and the current of the battery cell 100. Meanwhile, time t in FIG. 13 is assumed to be the same as time t in FIG. 12.

As shown in FIG. 13(*a*), in the comparative example, the voltage of the maximum voltage cell increases monotonically from the charge start. In addition, since the internal resistance of the maximum voltage cell is small, a rise in the voltage of the maximum voltage cell is faster than that in the voltage of the minimum voltage cell.

In the comparative example, the battery control unit 400 does not perform control for reducing a charge current on the basis of the voltage of the maximum voltage cell. Since the charge is performed by a constant-current and constant-voltage charging method, the charge current is kept constant at $I_C$. Therefore, until the sum of the voltages of N battery cells 100 becomes equal to $NV_2$, the voltage of the maximum voltage cell continues to rise even when the voltage is set to be equal to or greater than the charge reference voltage value $V_2$.

The voltage of the maximum voltage cell further rises up to the over-charge detection voltage value $V_{OC}$. In this manner, when the voltage of the maximum voltage cell rises up to the over-charge detection voltage value $V_{OC}$, the battery control unit 400 transmits a signal for stopping charge to the switch 500 through the measurement unit 200. Thereby, the battery control unit 400 terminates the charge forcibly.

In addition, as shown in FIG. 13(*b*), the residual capacity of the maximum voltage cell has not reached the full charge capacity $C_{Ra}$. That is, in spite of all the battery cells 100 being in a state of not yet being charged sufficiently, the charge is terminated forcibly.

When recharge is performed from this state in order to charge other battery cells 100, the voltage of the maximum voltage cell exceeds the over-charge detection voltage value $V_{OC}$. In this case, the charge of the above voltage value or higher cannot be performed.

In this manner, in the comparative example, there is the possibility of the charge being terminated forcibly in spite of not being fully charged, as a whole of the battery pack 10, due to the voltage of a specific battery cell 100.

On the other hand, according to the seventh exemplary embodiment, when the charge of the battery cells 100 is performed, the battery control unit 400 outputs the first signal for reducing a charge current in the charge before the maximum voltage cell is over-charged. Thereby, it is possible to reduce the charge current with respect to the charger 90 connected to the battery pack 10. Therefore, a case where the maximum voltage cell is over-charged does not occur. In this manner, it is possible to prevent the termination of the charge due to the voltage of a specific battery cell.

In addition, according to the seventh exemplary embodiment, a case does not occur in which the charge of the maximum voltage cell is terminated forcibly due to over-charge. Thereby, it is possible to continue to charge other battery cells 100. That is, it is possible to bring the entire battery pack 10 close to full charge.

Further, according to the seventh exemplary embodiment, a case does not occur in which the charge of the maximum voltage cell is terminated in an over-charged state. Therefore, it is possible to suppress a deterioration in maximum voltage cell.

As described above, according to the seventh exemplary embodiment, the battery pack 10 having the plurality of battery cells 100 which are connected in series to each other can be prevented from being over-charged, and be charged stably and for a long time.

As described above, according to the seventh exemplary embodiment, a case where the internal resistances of the respective battery cells 100 are different from each other has been described, but it is possible to obtain the same effect even in a case where the full charge capacities of the respective battery cells 100 are different from each other.

Eighth Exemplary Embodiment

Figure 14:
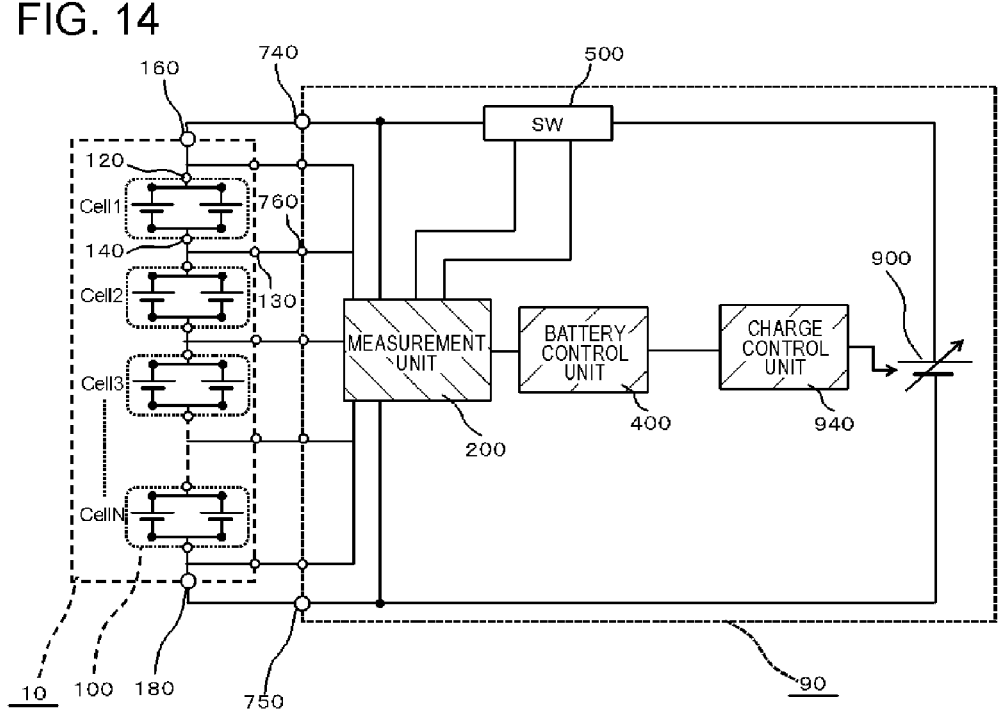
FIG. 14 is a circuit diagram illustrating a configuration of a battery pack and a charger according to an eighth exemplary embodiment.

FIG. 14 is a circuit diagram illustrating a configuration of a battery pack 10 and a charger 90 according to an eighth exemplary embodiment. The eighth exemplary embodiment is the same as the seventh exemplary embodiment, except that the control circuit 20 of the battery pack 10 in the seventh exemplary embodiment is included in the charger 90. Hereinafter, a detailed description will be given.

As shown in FIG. 14, the battery pack 10 of the eighth exemplary embodiment is not provided with the control circuit 20. That is, the battery pack 10 includes only a plurality of battery cells 100 which are connected in series to each other. The positive electrode terminal 160 is provided on the side of Cell 1 of the battery pack 10. On the other hand, the negative electrode terminal 180 is provided on the side of Cell N of the battery pack 10. In addition, a battery cell terminal 130 is provided between each of the battery cells 100.

The charger 90 of the eighth exemplary embodiment includes the measurement unit 200, the battery control unit 400 and the switch 500 in addition to the power supply source 900 and the charge control unit 940. The measurement terminal 760 is provided on the battery pack 10 side of the charger 90.

In addition, the positive electrode terminal 740 and the negative electrode terminal 750 are provided on the battery pack 10 side of the charger 90. The positive electrode terminal 740 and the negative electrode terminal 750 of the charger 90 are respectively connected to the positive electrode terminal 160 and the negative electrode terminal 180 of the battery pack 10. Thereby, the charger 90 can charge the battery pack 10.

In addition, the measurement unit 200 is connected to the measurement terminal 760. The measurement terminal 760 of the charger 90 is connected to the battery cell terminal 130 of the battery pack 10 through an interconnect (no sign shown). Thereby, the measurement unit 200 can measure the voltage of each of the battery cells 100.

According to the eighth exemplary embodiment, it is possible to obtain the same effect as that in the seventh exemplary embodiment. Further, according to the eighth exemplary embodiment, it is possible to simplify the battery pack 10 which is frequently exchanged.

In the aforementioned exemplary embodiments, the battery control unit 400 may output the first signal in response to both the case where the discharge of the battery cells 100 is performed and the case where the charge of the battery cells 100 is performed.

In the aforementioned exemplary embodiments, a case has been described in which the battery control unit 400 transmits the first signal on the basis of the discharge reference voltage value $V_1$ or the charge reference voltage value $V_2$. As described above, the voltage of the minimum voltage cell or the maximum voltage cell fluctuates through the control of the load control unit 640 or the charge control unit 940. Among them, the battery control unit 400 may set a second discharge reference voltage value lower than the discharge reference voltage value $V_1$, or a second charge reference voltage value higher than the charge reference voltage value $V_2$, and may transmit a second signal. In this case, the load control unit 640 or the charge control unit 940 may reduce the discharge current or the charge current more greatly. Meanwhile, the battery control unit 400 may not just transmit the second signal but transmit signals in multiple steps.

In the aforementioned exemplary embodiments, a case has been described in which the battery control unit 400 transmits a signal to the switch 500 through the measurement unit 200, but the battery control unit 400 may transmit a signal directly to the switch 500.

As described above, although the exemplary embodiments of the present invention have been set forth with reference to the drawings, they are merely illustrative of the present invention, and various configurations other than those stated above can be adopted. For example, in the above exemplary embodiments, a case where the battery cell 100 is a laminate-type battery has been described, but the effect of the present invention can be obtained similarly even when the battery cell 100 is a battery having other forms such as a cylindrical shape and a square shape.

The invention claimed is:

1. A battery control system comprising:
a measurement unit that measures voltages of a plurality of battery units which are connected in series to each other; and
a battery control unit that controls discharge of the battery units on the basis of the voltages measured by the measurement unit,
wherein the battery control unit:
specifies a minimum voltage unit in which the voltage is lowest, on the basis of the voltages measured by the measurement unit, when the discharge of the battery unit is performed,
continues the discharge of all the battery units, as they are, when an alarm condition that the voltage of the minimum voltage unit is equal to or less than a discharge reference voltage value is not satisfied, the discharge reference voltage value being higher than an over-discharge detection voltage value indicating an over-discharged state, and
outputs a first signal for reducing a discharge current in the discharge in response to the alarm condition being satisfied.

2. The battery control system according to claim 1, further comprising a load control unit, connected to the battery control unit, which receives the first signal and controls a load that consumes power of the discharge,
wherein the load control unit reduces the discharge current when the first signal is received from the battery control unit.

3. The battery control system according to claim 2, wherein the load control unit controls the load so that the voltage of the minimum voltage unit is kept constant at the discharge reference voltage value, on the basis of the first signal.

4. The battery control system according to claim 1, wherein the battery unit is a battery control system including a lithium-ion secondary battery.

5. A battery control system comprising:
a measurement unit that measures voltages of a plurality of battery units which are connected in series to each other; and
a battery control unit that:
controls charge of the battery units on the basis of the voltages measured by of the measurement unit,
wherein the battery control unit specifies a maximum voltage unit in which the voltage is highest, on the basis of the voltages measured by the measurement unit, when the charge is performed on the battery units,
continues the charge of all the battery units, as they are, when an alarm condition that the voltage of the maximum voltage unit is equal to or greater than a charge reference voltage value is not satisfied, the charge reference voltage value being lower than an over-charge detection voltage value indicating an over-charged state, and
outputs a first signal for reducing a charge current in the charge in response to the alarm condition being satisfied.

6. The battery control system according to claim 5, further comprising a charge control unit, connected to the battery control unit, which receives the first signal and controls a charge voltage and a charge current in the charge,
wherein the charge control unit reduces the charge current when the first signal is received from the battery control unit.

7. The battery control system according to claim 6, wherein the charge control unit performs control so that the voltage of the maximum voltage unit is kept constant at the charge reference voltage value, on the basis of the first signal.

8. A battery pack comprising:
a plurality of battery units which are connected in series to each other;
a measurement unit that measures voltages of the battery units; and
a battery control unit that controls discharge of the battery units on the basis of the voltages measured by the measurement unit,
wherein the battery control unit:
specifies a minimum voltage unit in which the voltage is lowest, on the basis of the voltages measured by the measurement unit, when the discharge of the battery unit is performed,
continues the discharge of all the battery units, as they are, when an alarm condition that the voltage of the minimum voltage unit is equal to or less than a discharge reference voltage value is not satisfied, the discharge reference voltage value being higher than an over-discharge detection voltage value indicating an over-discharged state, and
outputs a first signal for reducing a discharge current in the discharge in response to the alarm condition being satisfied.

9. A battery pack comprising:
a plurality of battery units which are connected in series to each other;
a measurement unit that measures voltages of the battery units; and
a battery control unit that controls charge of the battery units on the basis of the voltages measured by of the measurement unit, wherein the battery control unit:
  specifies a maximum voltage unit in which the voltage is highest, on the basis of the voltages measured by the measurement unit, when the charge is performed on the battery units,
  continues the charge of all the battery units, as they are, when an alarm condition that the voltage of the maximum voltage unit is equal to or greater than a charge reference voltage value is not satisfied, the charge reference voltage value being lower than an over-charge detection voltage value indicating an over-charged state, and
  outputs a first signal for reducing a charge current in the charge in response to the alarm condition being satisfied.

10. An electronic device comprising:
a battery pack including a plurality of battery units which are connected in series to each other;
a measurement unit that measures voltages of the battery units;
a battery control unit that controls discharge of the battery units on the basis of the voltages measured by the measurement unit;
a load that consumes power of the discharge from the battery pack; and
a load control unit, connected to the battery control unit which controls the load,
wherein the battery control unit:
  specifies a minimum voltage unit in which the voltage is lowest, on the basis of the voltages measured by the measurement unit, when the discharge of the battery unit is performed,
  continues the discharge of all the battery units, as they are, when an alarm condition that the voltage of the minimum voltage unit is equal to or less than a discharge reference voltage value is not satisfied, the discharge reference voltage value being higher than an over-discharge detection voltage value indicating an over-discharged state, and
  outputs a first signal for reducing a discharge current in the discharge in response to the alarm condition being satisfied, and
the load control unit reduces the discharge current when the first signal is received from the battery control unit.

11. The electronic device according to claim 10, wherein the load includes at least one or more light-emitting units, and
  the load control unit reduces the discharge current by lowering luminance of the light-emitting unit when the first signal is received from the battery control unit.

12. The electronic device according to claim 10, wherein the load includes at least one or more processor units, and
  the load control unit reduces the discharge current by lowering a processing speed of the processor unit when the first signal is received from the battery control unit.

13. The electronic device according to claim 10, wherein the electronic device is a portable communication terminal that performs a phone call or packet communication,
  the load includes a communication unit that performs the communication, and
  the load control unit restricts the phone call when the first signal is received from the battery control unit, and reduces the discharge current by controlling the communication unit so as to perform only the packet communication.

14. The electronic device according to claim 10, wherein the load includes at least one or more motor units, and
  the load control unit reduces the discharge current by reducing the power which is supplied to the motor unit when the first signal is received from the battery control unit.

15. The electronic device according to claim 10, further comprising an engine unit which is driven by gasoline,
  wherein the load is at least one or more motor units, and
  the load control unit reduces a power supply amount from the battery pack to the motor unit when the first signal is received from the battery control unit, and reduces the discharge current by increasing a drive ratio in the engine unit.

16. The electronic device according to claim 10, which is connected to at least one or more other power supply units other than the battery pack,
  wherein the load control unit reduces a power supply amount from the battery pack to the load when the first signal is received from the battery control unit, and increases the power supply amount from the power supply unit to the load.

17. The electronic device according to claim 10, wherein the load control unit gradually reduces the discharge current that consumes the load when the first signal is received from the battery control unit.

18. The electronic device according to claim 10, further comprising a plurality of the loads,
  wherein the load control unit gradually reduces the number of loads that presently consume the power when the first signal is received from the battery control unit.

19. A charger comprising:
a measurement unit that measures voltages of a plurality of battery units which are connected in series to each other;
a battery control unit that controls charge of the battery units on the basis of the voltages measured by of the measurement unit; and
a charge control unit, connected to the battery control unit, which controls a charge voltage and a charge current in the charge,
wherein the battery control unit:
  specifies a maximum voltage unit in which the voltage is highest, on the basis of the voltages measured by the measurement unit, when the charge is performed on the battery units,
  continues the charge of all the battery units, as they are, when an alarm condition that the voltage of the maximum voltage unit is equal to or greater than a charge reference voltage value is not satisfied, the charge reference voltage value being lower than an over-charge detection voltage value indicating an over-charged state, and
  outputs a first signal for reducing the charge current in the charge in response to the alarm condition being satisfied, and
the charge control unit reduces the charge current when the first signal is received from the battery control unit.

* * * * *

UNITED STATES PATENT AND TRADEMARK OFFICE
CERTIFICATE OF CORRECTION

PATENT NO. : 9,641,006 B2
APPLICATION NO. : 14/379365
DATED : May 2, 2017
INVENTOR(S) : Tadahiro Yoshida It is certified that error appears in the above-identified patent and that said Letters Patent is hereby corrected as shown below:

In the Specification

Column 12, Line 10:
"$V_2$." has been replaced with --$V_1$.--

Signed and Sealed this
Thirty-first Day of July, 2018

Andrei Iancu
*Director of the United States Patent and Trademark Office*